United States Patent
Aiouaz et al.

(10) Patent No.: US 12,112,058 B2
(45) Date of Patent: Oct. 8, 2024

(54) RECONFIGURABLE MICROSERVICE STORAGE DEVICE SYSTEM

(71) Applicant: Dell Products L.P., Round Rock, TX (US)

(72) Inventors: Ali Aiouaz, Bee Cave, TX (US); Gaurav Chawla, Austin, TX (US); Leland W. Thompson, Tustin, CA (US); James Ulery, Eastvale, CA (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 17/969,818

(22) Filed: Oct. 20, 2022

(65) Prior Publication Data
US 2024/0134561 A1 Apr. 25, 2024
US 2024/0231677 A9 Jul. 11, 2024

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC . G06F 8/60; G06F 8/65; G06F 3/0655; G06F 3/0604; G06F 3/0679
See application file for complete search history.

(56) References Cited

U.S. PATENT DOCUMENTS

| | | |
|---|---|---|
| 9,781,211 B2 | 10/2017 | Langas et al. |
| 2008/0010290 A1 | 1/2008 | Lecrone et al. |
| 2019/0065093 A1* | 2/2019 | Karr ...................... G06F 3/0688 |

* cited by examiner

*Primary Examiner* — Gurtej Bansal
(74) *Attorney, Agent, or Firm* — Joseph Mencher

(57) ABSTRACT

A reconfigurable microservice storage device system includes a computing device coupled to a plurality of storage devices that each include storage device compute hardware coupled to a storage subsystem that is configured to store data. The computing device configures the storage device compute hardware in each of a first subset of the plurality of storage devices to provide a respective first storage device operating system that includes a respective first storage device management microservice that manages the storage subsystem in that storage device. The computing device also configures the storage device compute hardware in each of a second subset of the plurality of storage devices to provide a respective second storage device operating system that includes a respective second storage device management microservice that manages the storage subsystem in that storage device, and at least one respective second compute microservice that performs at least one second compute operation.

20 Claims, 27 Drawing Sheets

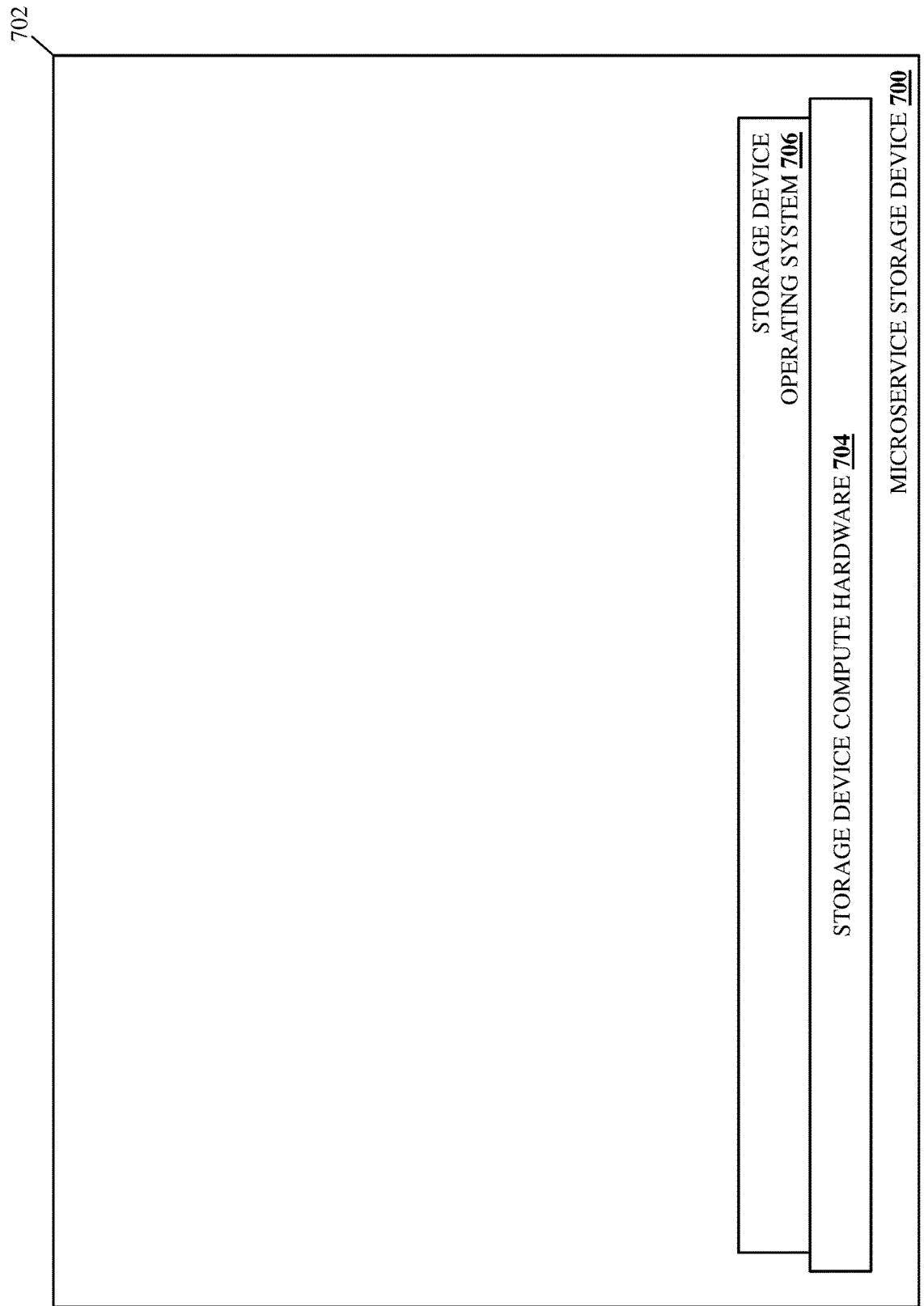

RECONFIGURABLE MICROSERVICE STORAGE DEVICE SYSTEM

BACKGROUND

The present disclosure relates generally to information handling systems, and more particularly to storage devices that are configurable to provide microservices and that are included in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, have traditionally performed computing operations using a Central Processing Unit (CPU) or other "host" subsystem in the computing device. To provide one example, a CPU in a computing device may perform conventional compute operations by first either receiving/retrieving data (e.g., receiving data from an application, retrieving data from a storage device, etc.) and writing that data to a memory system in the computing device, and then performing the compute operations on the data in the memory system. However, efforts to offload compute operations from the CPU are being developed. For example, the Non-Volatile Memory express (NVMe) Computational Storage Task Group is developing "computational storage" capabilities for NVMe storage devices that enable NVMe storage devices to offload compute operations from the CPU in the computing device in which they are used.

The computational storage systems discussed above generally require the CPU in the computing device to sequence the compute operation steps that offload the compute operations discussed above and then direct the storage device to perform those compute operation steps, and may include the CPU providing a storage device compute application on the storage device, reading data from its local persistent storage (such as NAND Flash) into a local memory in the storage device, instructing the start of the compute operations by the storage device, reading the results of the compute operation from the storage device, as well as other conventional CPU-directed computational storage operations known in the art. The inventors of the present disclosure have identified several issues with such conventional computational storage systems.

For example, the development of such conventional computational storage systems focuses on existing CPU compute operation paradigms and is primarily based on the modification of existing software, and requires identification of compute operation elements that may be offloaded from the CPU, as well as the creation of the storage device compute applications, command sequences, and other functionality required to enable those compute operation element offloads. Furthermore, conventional computational storage systems have a relatively limited set of developers due to the need to understand NVMe programming constructs, how data is stored and/or manipulated in the storage devices (e.g., a storage device stack in the storage device may be configured to perform data manipulation operations such as encryption, compression, etc.), where data is stored (e.g., particularly when data redundancy techniques such as Redundant Array of Independent Disks (RAID) are used), storage device implementation specifics (e.g., a type of processor included in the storage device), etc. Further still, the different capabilities of different storage devices present difficulties in making computational storage capabilities functional across different generations of devices or devices from different manufacturers, while presenting limitations on how those computational storage capabilities are implemented (e.g., due to storage size limitations on the number and/or size of storage device compute applications). Finally, different users and/or deployments may require storage device compute applications like those discussed above to be configured differently (e.g., a storage device compute application providing a particular computational storage capability (e.g., data filtering) may be provided in different deployments that require different deployment configurations for that storage device compute application).

Accordingly, it would be desirable to provide a computational storage system that addresses the issues discussed above.

SUMMARY

According to one embodiment, an Information Handling System (IHS) includes a storage device chassis; a storage device processing system that is included in the storage device chassis; and a storage device memory system that is included in the storage device chassis, that is coupled to the storage device processing system, and that includes instructions that, when executed by the storage device processing system, cause the storage device processing system to: provide, using the storage device processing system, a storage device operating system that includes a storage device management microservice that manages a storage subsystem that is coupled to the storage device processing system and that is configured to store data; provide, using the storage device operating system, at least one compute microservice that performs at least one compute operation; receive a first reconfiguration instruction; and provide, in response to receiving the first reconfiguration instruction, the storage device operating system that includes the storage device management microservice, and that does not include the at least one compute microservice.

BRIEF DESCRIPTION OF THE DRAWINGS

FIG. 7A is a schematic view illustrating an embodiment of the microservice storage device of FIGS. 3 and 4 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
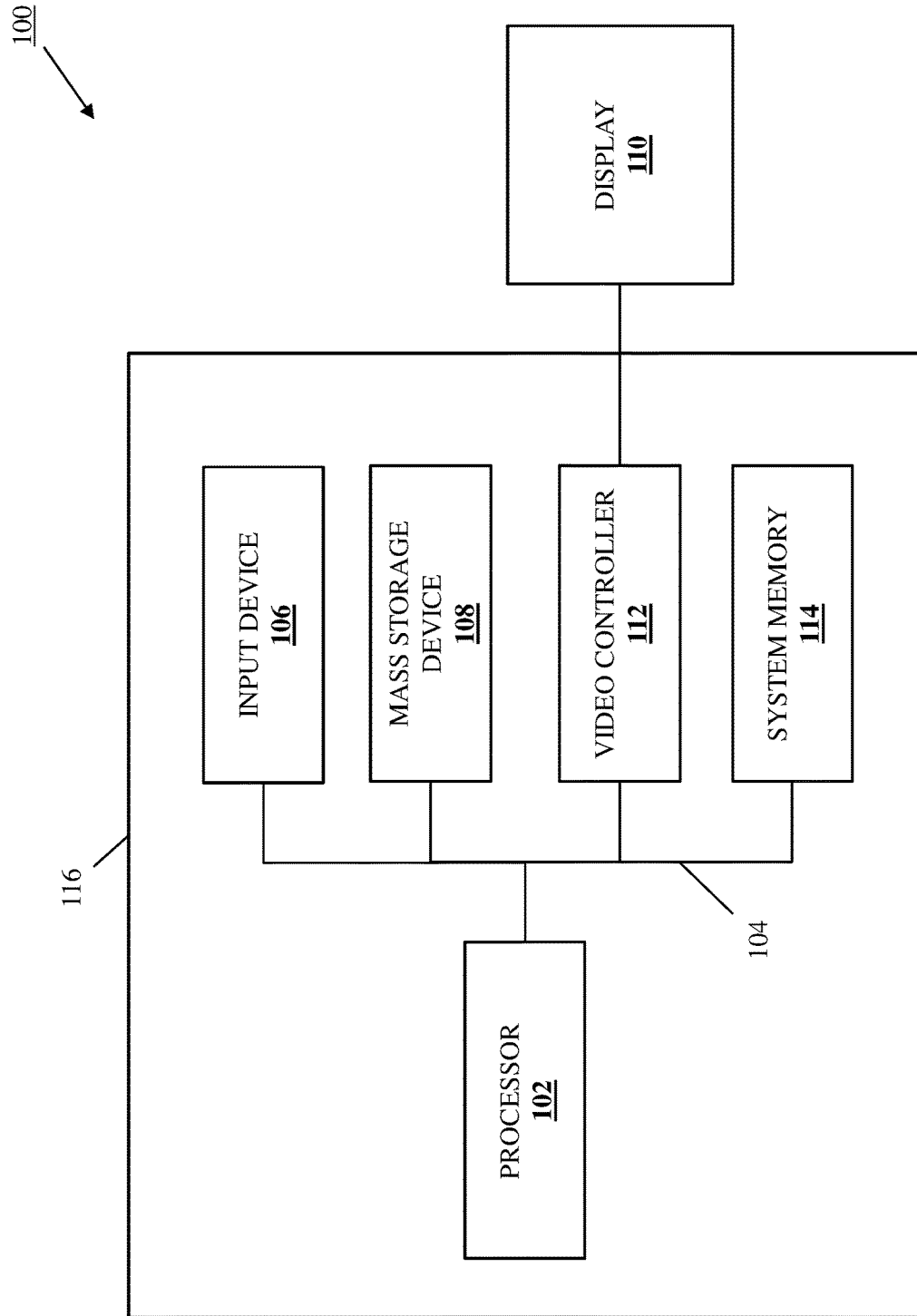
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
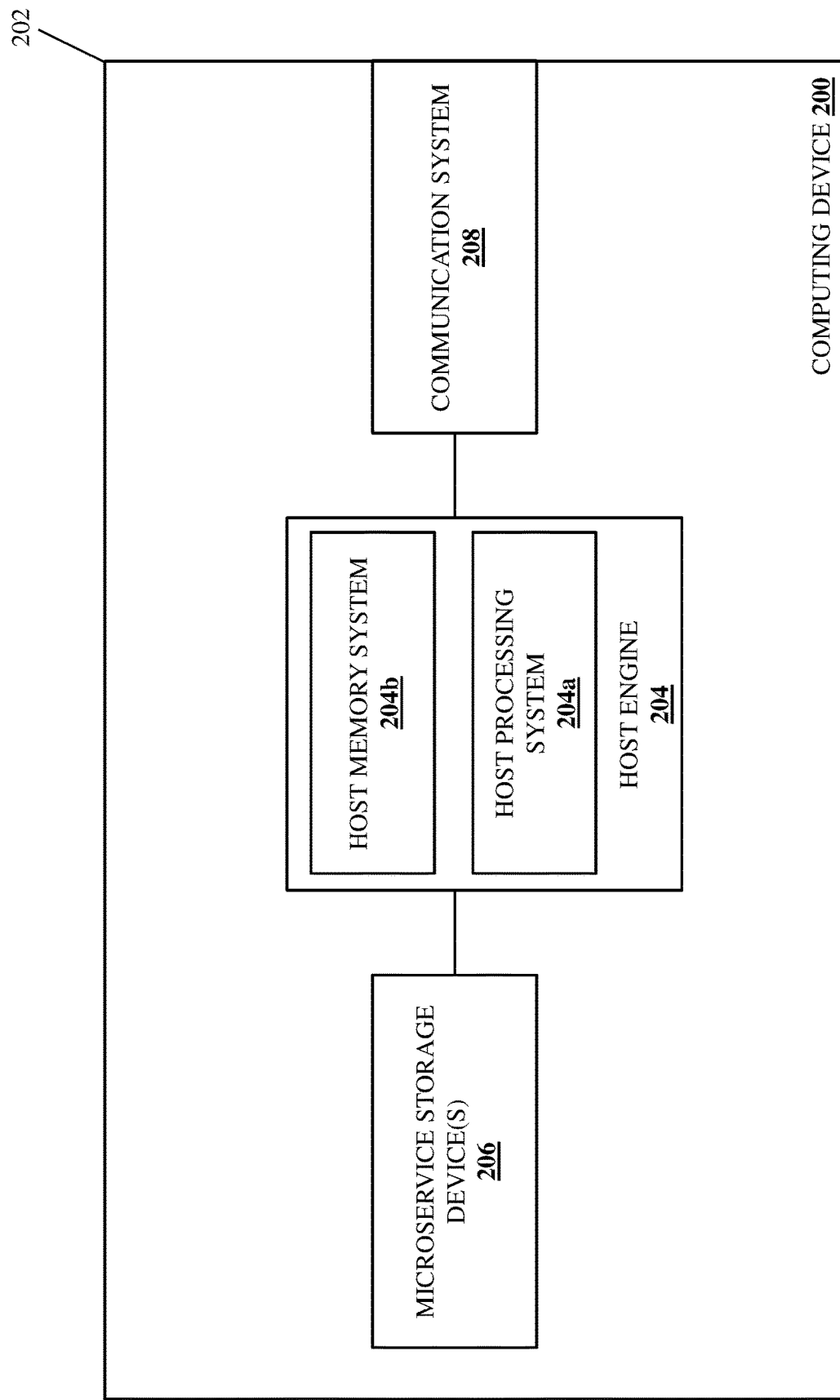
FIG. 2 is a schematic view illustrating an embodiment of a computing device that may include the microservice storage device system of the present disclosure.

Referring now to FIG. 2, an embodiment of a computing device 200 is illustrated that may include the microservice storage device system of the present disclosure. In an embodiment, the computing device 200 may be provided by the IHS 100 discussed above with reference to FIG. 1 and/or may include some or all of the components of the IHS 100, and in specific examples may be provided by a server device, desktop computing device, laptop/notebook computing device, tablet computing device, mobile phone, and/or other computing devices that would be apparent to one of skill in the art in possession of the present disclosure. However, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and discussed below. For example, the chassis 202 may house a host processing system 204a (e.g., the processor 102 discussed above with reference to FIG. 1) and a host memory system 204b (e.g., the memory 114 discussed above with reference to FIG. 1) that is coupled to the host processing system 204a and that includes instructions that, when executed by the host processing system 204a, cause the host processing system 204a to provide a host engine 204 that is configured to perform the functionality of the host engines and/or computing devices discussed below. For example, and as would be appreciated by one of skill in the art in possession of the present disclosure, the host engine 204 may be enabled by a Central Processing Unit (CPU)/host processing system 204a and may be configured to perform a variety of host functionality while remaining within the scope of the present disclosure as well.

In the illustrated embodiment, the chassis 202 also houses one or more microservice storage devices 206 (e.g., that may provide the storage 108 discussed above with reference to FIG. 1) that are coupled to the host engine 204 (e.g., via a coupling between the microservice storage device(s) 206 and the host processing system 204a) and that may be provided according to the teachings of the present disclosure. The chassis 202 may also house a communication system 208 that is coupled to the host engine 204 (e.g., via a coupling between the communication system 208 and the host processing system 204a) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated and described, one of skill in the art in possession of the present disclosure will recognize that the microservice storage devices of the present disclosure may be included in other devices or systems that include a variety of components and/or component configurations for providing conventional functionality, as well as the functionality discussed below, while remaining within the scope of the present disclosure as well.

Figure 3:
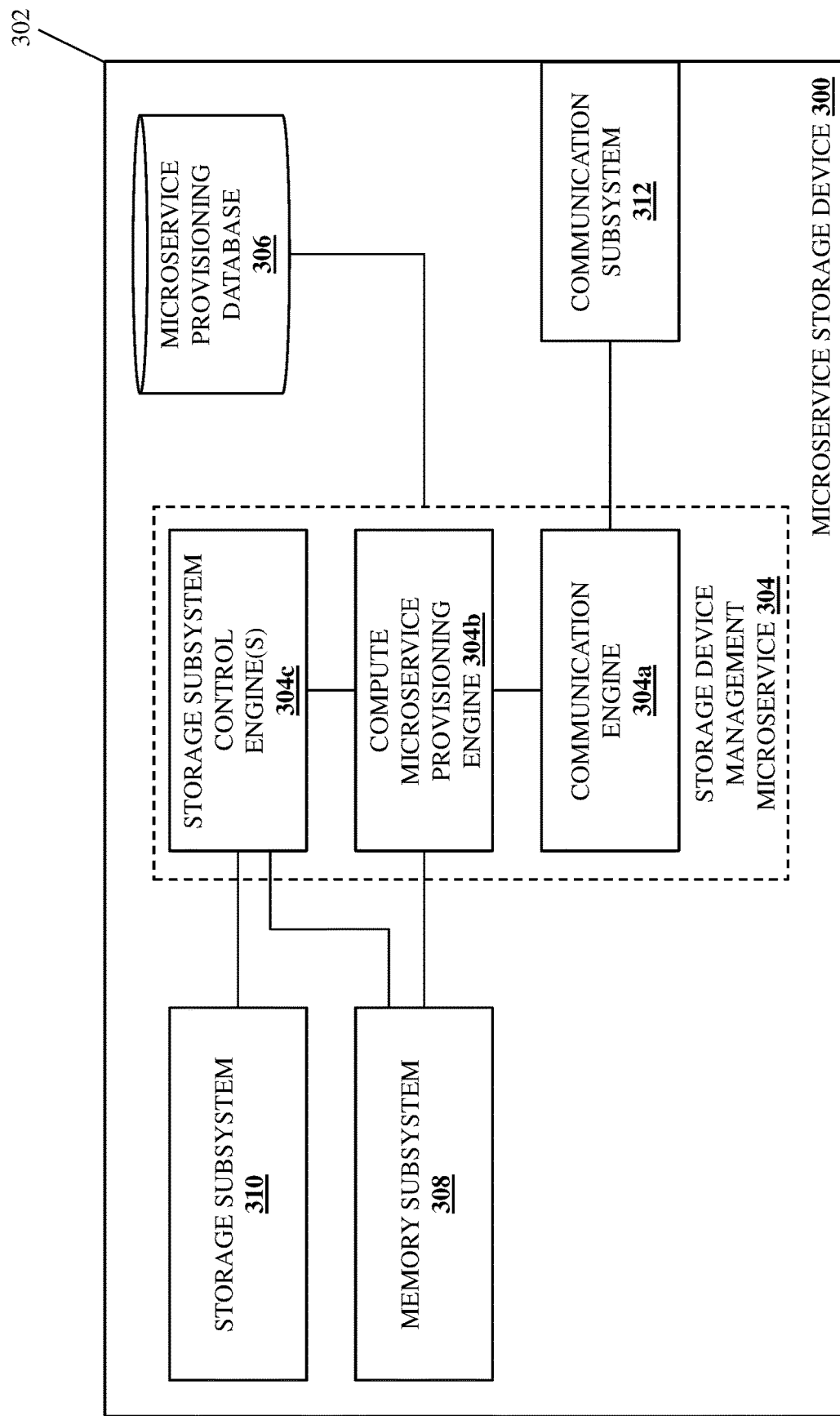
FIG. 3 is a schematic view illustrating an embodiment of a microservice storage device that may be provided according to the teachings of the present disclosure and that may be included in the computing device of FIG. 2.

Referring now to FIG. 3, an embodiment of an microservice storage device 300 is illustrated that may provide the microservice storage device(s) 206 discussed above with reference to FIG. 2. As such, the microservice storage device 300 may be provided in the IHS 100 discussed above with reference to FIG. 1 (e.g., as the storage device 108), and in specific examples may be provided by a Solid State Drive (SSD) storage device such as a Non-Volatile Memory express (NVMe) SSD storage device. However, while illustrated and discussed as being provided by particular storage devices, one of skill in the art in possession of the present disclosure will recognize that the functionality of the microservice storage device 300 discussed below may be provided by other storage devices utilizing other storage technologies while remaining within the scope of the present disclosure as well.

In the illustrated embodiment, the microservice storage device 300 includes a chassis 302 that houses the components of the microservice storage device 300, only some of which are illustrated and discussed below. For example, the chassis 302 may house a storage device processing system (not illustrated, but which may include a processor similar to the processor 102 discussed above with reference to FIG. 1) and a storage device memory system (not illustrated, but which may include a memory similar to the memory 114 discussed above with reference to FIG. 1) that is coupled to the storage device processing system and that includes instructions that, when executed by the storage device processing system, cause the storage device processing system to provide a storage device management microservice 304 that is configured to perform the functionality of the storage device management microservices and/or microservice storage devices discussed below. In a specific example, the storage device management microservice 304 may be provided by an Application Specific Integrated Circuit (ASIC), firmware, an SSD controller, and/or other storage device processing/memory components that would be apparent to one of skill in the art in possession of the present disclosure. Furthermore, in other embodiments, the storage device management microservice 304 may be provided by a Data Processing Unit (DPU) that is located in a chassis that is separate from the chassis in which the storage subsystem 310 is located (e.g., the DPU/storage device management microservice 304 may be in a device (e.g., a server, a dedicated DPU device, etc.) that is separate from the storage device that includes the storage subsystem 310) and may be coupled to the storage subsystem 310 via a bus (e.g., a PCIe bus), a network (e.g., as discussed below with reference to FIG. 20), etc.

In the illustrated embodiment, the storage device memory system housed in the chassis 302 includes instructions that, when executed by the storage device processing system, cause the storage device processing system to provide a communication engine 304a that is part of the storage device management microservice 304 and that is configured to perform communication functionality for the microservice storage device 300 including, for example, utilizing a communication protocol (e.g., an NVMe communication protocol) to enable communications between the storage device management microservice 304 and the host engine 204 in the computing device 200 discussed above with reference to FIG. 2. In the illustrated embodiment, the storage device memory system housed in the chassis 302 also includes instructions that, when executed by the storage device processing system, cause the storage device processing system to provide a compute microservice provisioning engine 304b that is part of the storage device management microservice 304 and that is configured to perform the compute microservice provisioning functionality for the microservice storage device 300 discussed below. In a specific example, the compute microservice provisioning engine 304b may be provided by a Flash Translation Layer (FTL) subsystem, although one of skill in the art in possession of the present disclosure will appreciate how other storage device subsystems may provide the compute microservice provisioning engine 304b while remaining within the scope of the present disclosure as well.

In the illustrated embodiment, the storage device memory system housed in the chassis 302 also includes instructions that, when executed by the storage device processing system, cause the storage device processing system to provide one or more storage subsystem control engines 304c that are part of the storage device management microservice 304 and that are configured to perform the storage subsystem control functionality for the microservice storage device 300 discussed below. In a specific example, the storage subsystem control engine(s) 304c may be provided by NAND/flash device engines that are configured to translate NAND/flash device commands for provisioning to NAND/flash devices, although one of skill in the art in possession of the present disclosure will appreciate how other storage device subsystems may provide the storage subsystem control engine(s) 304c while remaining within the scope of the present disclosure as well. In the illustrated embodiment, the chassis 302 may also house a storage system that is coupled to the storage device management microservice 304 (e.g., via a coupling between the storage system and the storage device processing system) and that includes a microservice provisioning database 306 that is configured to store any of the information utilized by the storage device management microservice 304 discussed below.

The chassis 302 may also house a memory subsystem 308 that is that is coupled to each of the compute microservice provisioning engine 304b and the storage subsystem control engine(s) 304c in the storage device management microservice 304 (e.g., via a coupling between the memory subsystem 308 and the storage device processing system). In a specific example, the memory subsystem 308 illustrated in FIG. 3 may represent multiple different memory subsystems that are accessible to the microservice provision engine 304b and the storage subsystem control engine(s) 304c such as, for example, an internal memory subsystem that may be provided by an "on-chip" memory subsystem included in the storage device processing system that provides the storage device management microservice 304 and that may be used for read operations that are relatively faster, more prevalent, and require relatively less power; a Dynamic Random Access Memory (DRAM) memory subsystem that may be used for write operations and background operations (or other combined read/write operations) that are relatively slower, less prevalent, and require relatively more power; and/or other memory subsystems that would be apparent to one of skill in the art in possession of the present disclosure. However, while the memory subsystem 308 is illustrated and described as being included in the chassis 302, one of skill in the art in possession of the present disclosure will appreciate how embodiments of the memory subsystem 308 that include the DRAM memory subsystem discussed above may provide that DRAM memory subsystem inside the chassis 302 of the microservice storage device 300 (e.g., as an internal DRAM memory subsystem), or outside the chassis 302 of the microservice storage device 300 (e.g., as an external DRAM memory subsystem that provided in the chassis 202 of the computing device 200 discussed above with reference to FIG. 2 and coupled to the microservice storage device 300) while remaining accessible to the compute microservice provisioning engine 304b as described below.

Figure 20:
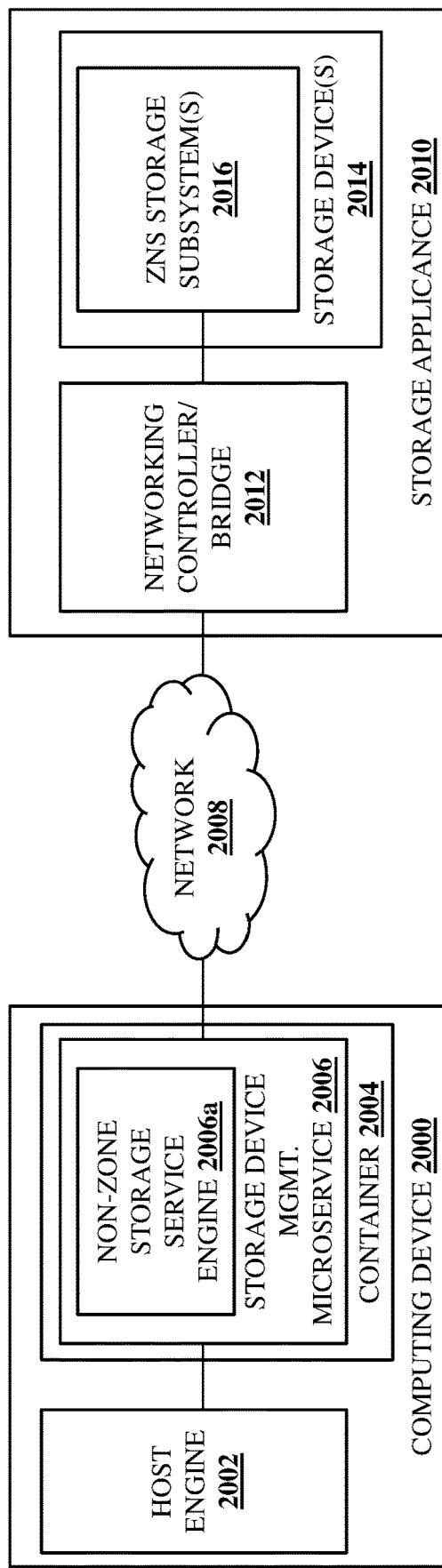
FIG. 20 is a schematic view illustrating an embodiment of a networked system that may provide a zoned namespace storage device system according to the teachings of the present disclosure.

The chassis 302 may also house a storage subsystem 310 that is coupled to the storage subsystem control engine(s) 304a in the storage device management microservice 304 (e.g., via a coupling between the storage subsystem 310 and the storage device processing system). In a specific example, the storage subsystem 310 may be provided by NAND/flash devices, although one of skill in the art in possession of the present disclosure will appreciate how other storage devices using other storage technologies will benefit from the teachings of the present disclosure and thus will fall within it scope as well. Furthermore, while the storage subsystem 310 is illustrated as included in the chassis 302 with the storage device management microservice 304, in some embodiments the storage subsystem 310 may be external to the chassis 302 that includes the storage device management microservice 304 (e.g., as illustrated in FIG. 20) while remaining within the scope of the present disclosure as well.

The chassis 302 may also house a communication system 312 that is coupled to the communication engine 304a in the storage device management microservice 304 (e.g., via a coupling between the communication system 312 and the storage device processing system) and that may be provided by any of a variety of storage device communication components that would be apparent to one of skill in the art in possession of the present disclosure. However, while a specific microservice storage device 300 has been illustrated and described, one of skill in the art in possession of the present disclosure will recognize that microservice storage devices (or other devices operating according to the teachings of the present disclosure in a manner similar to that described below for the microservice storage device 300) may include a variety of components and/or component configurations for providing conventional storage device functionality, as well as the functionality discussed below, while remaining within the scope of the present disclosure as well.

Figure 4:
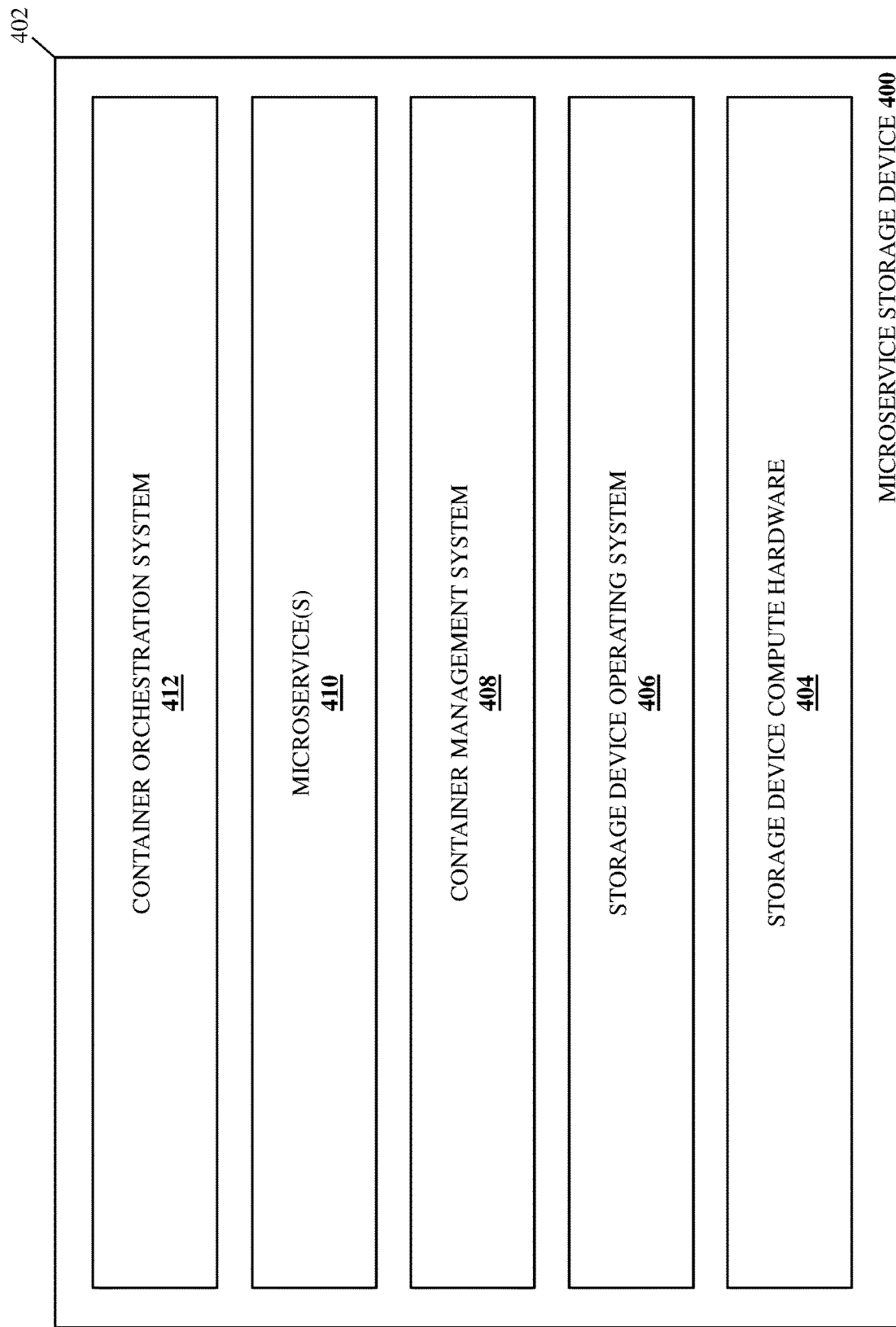
FIG. 4 is a schematic view illustrating an embodiment of a microservice storage device that may provide the microservice storage device of FIG. 3.

Referring now to FIG. 4, an embodiment of a microservice storage device 400 is illustrated that may provide any of the microservice storage device(s) 206 and/or 300 described above. As such, the microservice storage device 400 may be provided in the IHS 100 discussed above with reference to FIG. 1 (e.g., as the storage device 108), and in specific examples may be provided by a SSD storage device such as a NVMe SSD storage device. However, while illustrated and discussed as being provided by particular storage devices, one of skill in the art in possession of the present disclosure will recognize that the functionality of the microservice storage device 400 discussed below may be provided by other storage devices utilizing other storage technologies while remaining within the scope of the present disclosure as well.

In the illustrated embodiment, the microservice storage device 400 includes a chassis 402 that houses the components of the microservice storage device 400, only some of which are illustrated and discussed below. For example, the chassis 402 may house storage device compute hardware 404 that may be provided by the storage device processing system, the storage device memory, and/or other Central Processing Unit (CPU), Application-Specific Integrated Circuit (ASIC), firmware, SSD controller elements, and/or other compute hardware discussed above, storage device peripherals/hardware that allow the compute hardware to communicate with the storage subsystem 310 (e.g., NAND devices), accelerator devices, encryption/decryption devices, and/or other elements of the microservice storage device 400, as well as any other storage device compute hardware that would be apparent to one of skill in the art in possession of the present disclosure. The specific example of the microservice storage device 400 of FIG. 4 illustrates how the storage device compute hardware 404 may be utilized to provide a storage device operating system 406 such as, for example, a LINUX® operating system and/or other operating systems that one of skill in the art in possession of the present disclosure would appreciate may be run on the storage device compute hardware described herein.

The specific example of the microservice storage device 400 of FIG. 4 also illustrates how a container management system 408 may be provided using the storage device operating system 406. For example, the container management system 408 may be provided by DOCKER® container management open-source software that includes a set of Platform as a Service (PaaS) products that, as discussed below, may utilize the storage device operating system 406 to perform operating-system-level virtualization operations to provide microservices in packages called "containers", as well as any other container management software that would be apparent to one of skill in the art in possession of the present disclosure. As illustrated in FIG. 4, the microservice storage device 400 may include one or more microservices 410 that may be provided in the containers managed by the container management system 408. Furthermore, in some embodiments, the microservice storage device 400 may include a container orchestration system 412. For example, the container orchestration system 412 may be provided by a KUBERNETES® container orchestration open-source software that is configured to automate the microservice/container deployment, scaling, and management that one of skill in the art in possession of the present disclosure would recognize as providing the functionality described below, as well as any other container orchestration software that would be apparent to one of skill in the art in possession of the present disclosure.

As such, in a specific example, the microservice storage device 400 may be an SSD storage device with storage device compute hardware 404 that provides an SSD controller that is configured to run a LINUX® storage device operating system 406, a DOCKER® container management system 408, the microservice(s) 410 in container(s), and a KUBERNETES® container orchestration system 412 described above. However, one of skill in the art in possession of the present disclosure will appreciate how the microservice storage device 400 may utilize other storage device compute hardware to run other storage device operating systems, other container management systems, microservice(s) in container(s), and/or other container orchestration systems, while remaining within the scope of the present disclosure as well.

Figure 5:
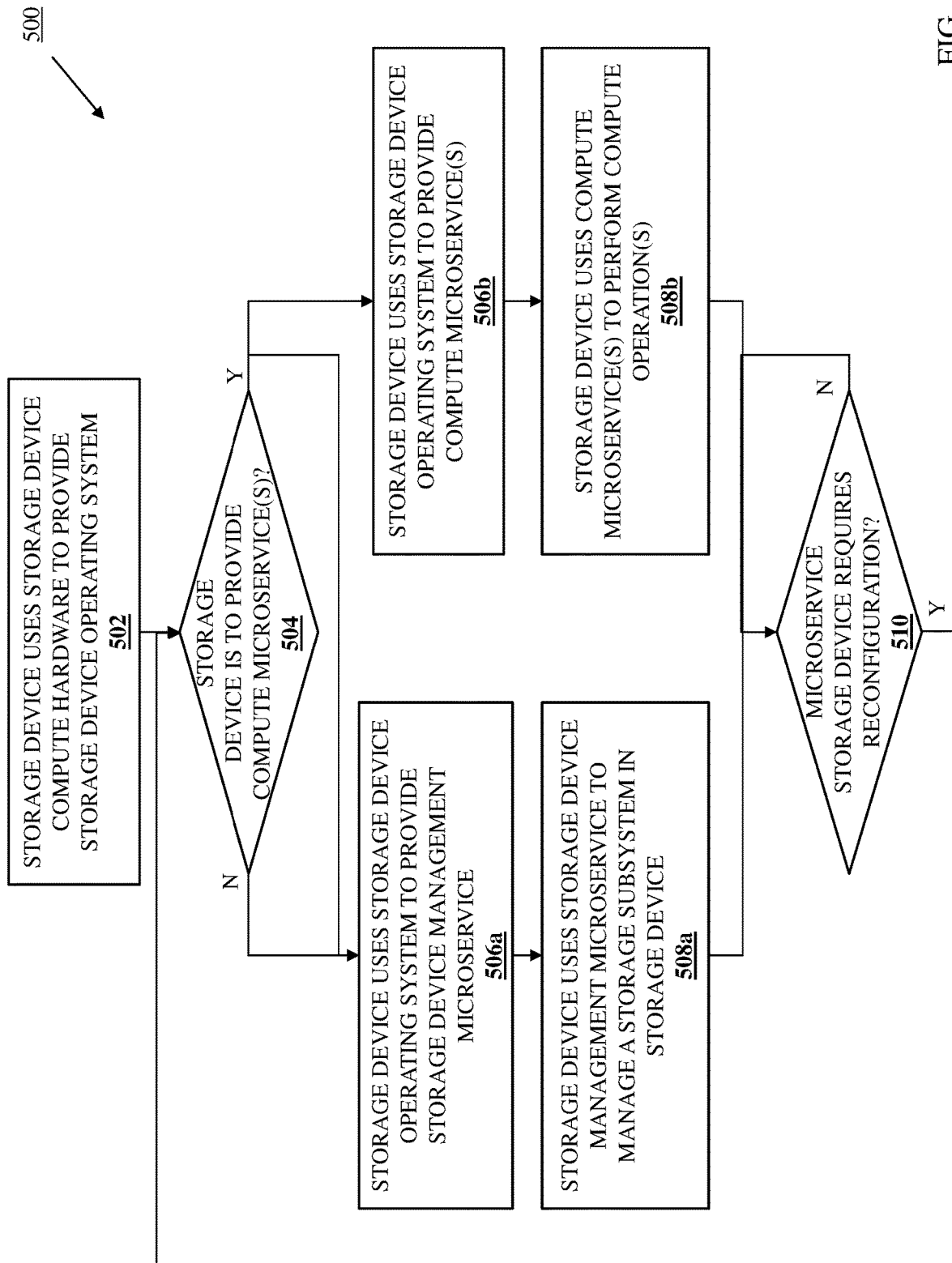
FIG. 5 is a flow chart illustrating an embodiment of a method for providing microservices using a storage device.

Referring now to FIG. 5, an embodiment of a method for providing microservices using a storage device is illustrated. As discussed below, the systems and methods of the present disclosure provide a storage device management microservice (e.g., storage device firmware that manages a storage subsystem) and one or more compute microservices (e.g., that perform compute operations) in a storage device using the same storage device compute hardware (e.g., a storage device controller). For example, the microservice storage device system of the present disclosure may include a computing device. A storage device is located in the computing device and includes storage device compute hardware coupled to a storage subsystem that is configured to store data. The storage device uses the storage device compute hardware to provide a storage device operating system. The storage device then uses the storage device operating system to provide a storage device management microservice that it uses to manage the storage subsystem. The storage device also uses the storage device operating system to provide at least one compute microservice that it uses to perform at least one compute operation. The storage device management microservice and the at least one compute microservice may each be provided in a respective container generated by the storage device operating system for each of the storage device management microservice and the at least one compute microservice. As such, the system and methods described below provides benefits over conventional storage devices that utilize separate storage device compute hardware (a first processing/memory subsystem and a second processing/memory subsystem) to provide storage device firmware and to perform conventional compute operation, with those benefits including (but not limited to) the ability to change storage device compute hardware allocations between the storage device management microservice and compute microservice(s).

Figure 6:
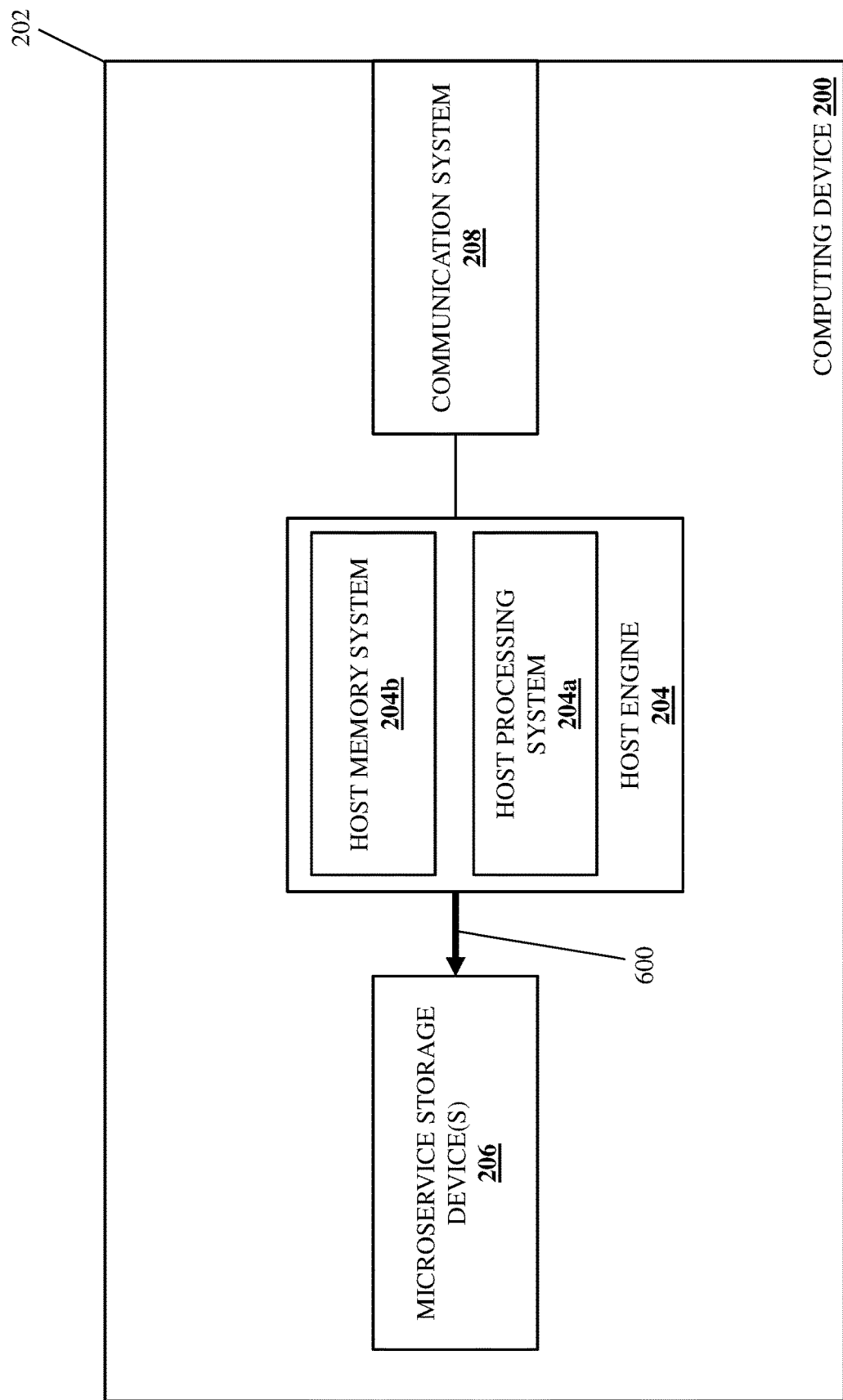
FIG. 6 is a schematic view illustrating an embodiment of the computing device of FIG. 2 operating during the method of FIG. 5.

The method 500 begins at block 502 where a storage device uses storage device compute hardware to provide a storage device operating system. With reference to FIG. 6, in an embodiment of block 502, the host engine 204 may perform microservice storage device configuration operations 600 that may include providing any configuration information (e.g., the storage device management microservice code, instructions, or other data discussed below; the compute microservice(s) code, instructions, or other data discussed below; etc.), configuration commands, and/or other data/communications that one of skill in the art in possession of the present disclosure would recognize as providing for the microservice storage device configuration described below. However, while the configuration of the microservice storage device 206 is illustrated and described herein as being initiated by the host engine 204, one of skill in the art in possession of the present disclosure will appreciate how any microservice storage device configuration described herein may be initiated on the microservice storage device in other manners (e.g., by a microservice storage device manufacturer) while remaining within the scope of the present disclosure.

With reference to FIG. 7A, an embodiment of a microservice storage device 700 is illustrated that may provide the microservice storage device 300 and/or 400 during the method 500. As such, the microservice storage device 700 includes a chassis 702 (which may be the chassis 302 of the microservice storage device 300 or the chassis 402 of the microservice storage device 400) that houses the components of the microservice storage device 700, only some of which are illustrated in FIG. 7A. As illustrated, the chassis 702 houses storage device compute hardware 704 that may include, for example, the storage device compute hardware 404 in the microservice storage device 400 and/or the storage device processing system and the storage device memory system that are described above as providing the storage device management microservice 304 in the microservice storage device 300. As such, in an embodiment of block 502, the storage device compute hardware 704 may utilize storage device operating system code, instructions, and/or other data to provide a storage device operating system 706, which as discussed above for the storage device operating system 406 in the microservice storage device 400, may include a LINUX® operating system and/or other operating systems that one of skill in the art in possession of the present disclosure would appreciate may be run on the storage device compute hardware described herein.

The method 500 then proceeds to decision block 504 where the method 500 proceeds depending on whether the storage device is to provide one or more compute microservices. As discussed below, the microservice storage devices of the present disclosure may be configurable/reconfigurable to provide both a storage device management microservice and compute microservice(s) in order to provide the microservice benefits of the present disclosure, as well as configurable/reconfigurable to provide only a storage device management microservice such that those microservice storage devices instead operate similar to conventional storage devices. As such, decision block 504 may cause the method 500 to proceed to provide any particular microservice storage device with one of those configurations. To provide a specific example, the configuration of the microservice storage device(s) may be based on the configuration commands received from the host engine 204 at block 502, whether the compute microservice code, instructions, or other data discussed below is stored in the microservice provisioning database 306 in the microservice storage device 300, whether a microservice storage device configuration for the microservice storage device that includes compute microservice(s) is identified in the storage device operating system 706, and/or based on other factors that would be apparent to one of skill in the art in possession of the present disclosure.

Figure 7B:
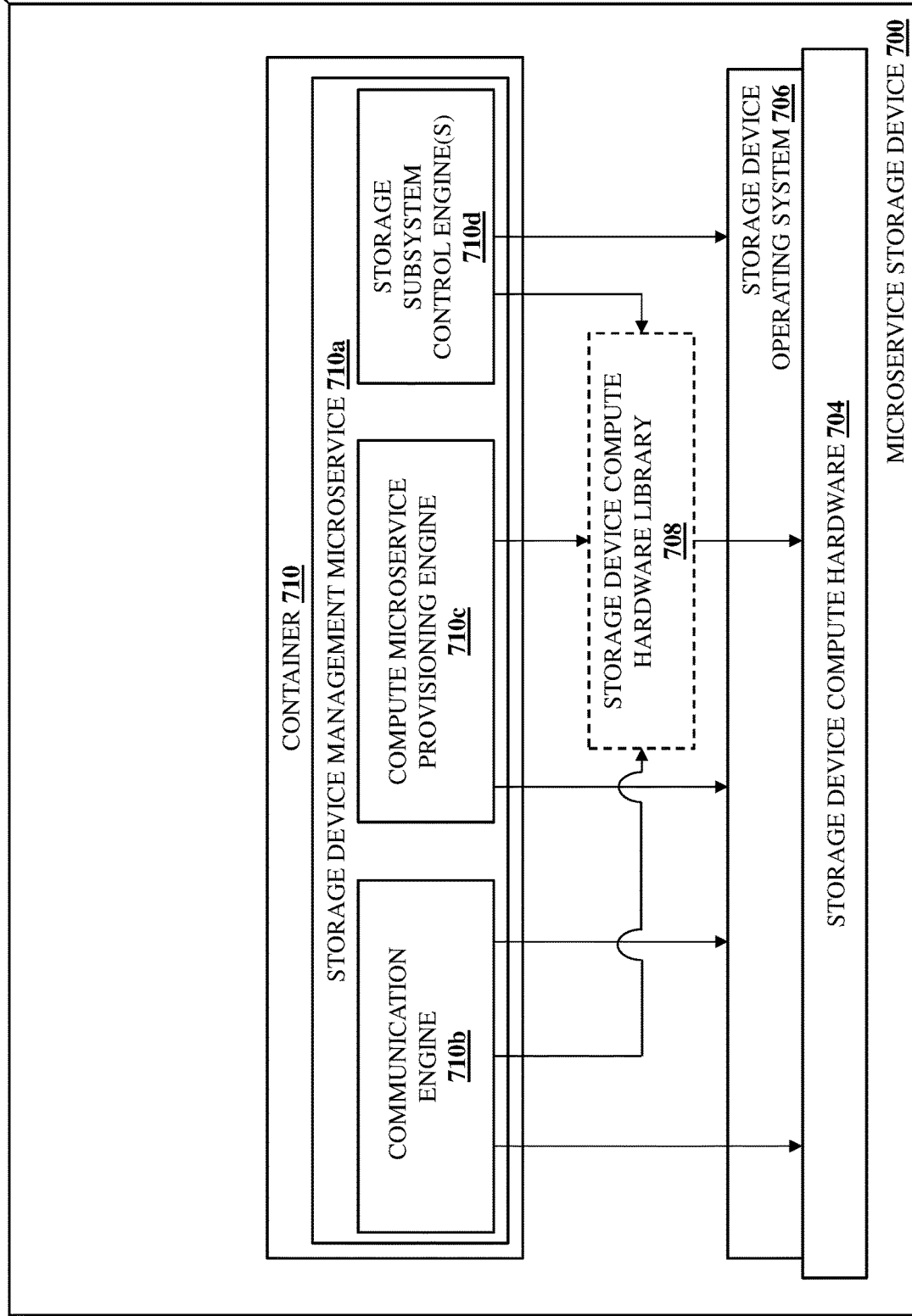
FIG. 7B is a schematic view illustrating an embodiment of the microservice storage device of FIGS. 3 and 4 operating during the method of FIG. 5.

If, at decision block 504, the storage device is not to provide compute microservice(s), the method 500 proceeds to block 506a where the storage device uses the storage device operating system to provide a storage device management microservice. With reference to FIG. 7B and the microservice storage device 700 discussed above with reference to FIG. 7A, in an embodiment of block 506a, the storage device operating system 706 provided using the storage device compute hardware 704 may utilize storage device management microservice code, instructions, or other data to provide a storage device management microservice 710a that may provide the storage device management microservice 304 in the microservice storage device 300 discussed above. As such, the storage device management microservice 710a may include a communication engine 710b, a compute microservice provisioning engine 710c, and storage subsystem control engine(s) 710d that are similar to the communication engine 304a, the compute microservice provisioning engine 304b, and the storage subsystem control engine(s) 304c discussed above.

In a specific example, and similarly as discussed above for the microservice(s) 410 in the microservice storage device 400, at block 506a a container management system (e.g., similar to the container management system 408 discussed above with reference to FIG. 4) may be provided in the microservice storage device 700 and may utilize the storage device operating system 706 to perform operating-system-level virtualization operations to generate, create, and/or otherwise provide a container 710, and then provide the storage device management microservice 710a in that container 710, as illustrated in FIG. 7B. As will be appreciated by one of skill in the art in possession of the present disclosure, the container 710 may be provided by a virtual container that packages the storage device management microservice code, instructions, and/or other data, along with all of its dependencies, in order to allow the storage device management microservice 710a to run quickly and reliably from one computing environment to another. As such, the container 710 may provide a lightweight, stand-alone, executable package of software that includes everything needed to run the storage device management microservice 710 including code information, runtime information, system tools, system libraries, settings, and/or other data that would be apparent to one of skill in the art in possession of the present disclosure. Furthermore, while not described herein in detail, a container orchestration system (e.g., similar to the container orchestration system 412 discussed above with reference to FIG. 4) may be provided in the microservice storage device 700 in order to automate the storage device management microservice 710a/container 710 deployment, scaling, and management that one of skill in the art in possession of the present disclosure will recognize provides for the functionality discussed below.

As will be appreciated by one of skill in the art in possession of the present disclosure, FIG. 7B illustrates how the container 710/storage device management microservice 710a allows the components of the storage device management microservice 710a to communicate with the storage device operating system 706, as well as with storage device compute hardware 704 via a storage device compute hardware library 708 (e.g., via the respective arrows between the storage device operating system 706 and each of the communication engine 710b, the compute microservice provisioning engine 710c, and the storage subsystem control engine(s) 710d; as well as via the respective arrows between the storage device compute hardware library 708 and each of the communication engine 710b, the compute microservice provisioning engine 710c, and the storage subsystem control engine(s) 710d, and the arrow between the storage device compute hardware library 708 and the storage device compute hardware 704).

As will be appreciated by one of skill in the art in possession of the present disclosure, the storage device compute hardware library 708 may include device-specific code that is configured to abstract the "uniqueness" of the autonomous compute storage device 700 from the containers/microservices provided therein so that those containers/microservices may operate agnostically with regard to the storage device compute hardware 704, allowing any communications between the storage device compute hardware 704 and any of the storage device management microservice 710a, the communication engine 710b, the compute microservice provisioning engine 710c, and/or the storage subsystem control engine(s) 710d that are required to allow for the functionality described herein. For example, the storage device compute hardware library 708 may be configured to allow containers/microservices provided in the autonomous compute storage device 700 to identify a number of NAND die, a number of blocks per NAND die, and/or other autonomous compute storage device inventory information that may be relatively unique to the autonomous compute storage device 700 without a need to code a plurality of different containers/microservices for relatively similar autonomous compute storage devices.

As such, the storage device management microservice 710a and compute microservices 712a, 714a, and up to 716a may operate without hardware dependencies. As discussed herein, the storage device management microservice 710a may utilize an abstraction layer provided by the storage device compute hardware library to operate on different types of storage device compute hardware (e.g., like the storage device compute hardware 704 illustrated in FIG. 7) via the "library view" of that storage device compute hardware described above. As such, storage device compute hardware libraries in different autonomous compute storage devices may provide the same API to the storage device management microservice 710*a* regardless of the particular implementation of their storage device compute hardware. However, while a particular functionality for the storage device compute hardware library 708 has been described, one of skill in the art in possession of the present disclosure will appreciate how other functionality and/or uses of the storage device compute library (e.g., by providing direct access to processing hardware in order to enable faster performance) will fall within the scope of the present disclosure as well.

The method 500 then proceeds to block 508*a* where the storage device uses the storage device management microservice to manage a storage subsystem in the storage device. In an embodiment, at decision block 508*a*, the storage device management microservice 304/710*a* in the microservice storage device 300/700 may operate to manage the storage subsystem 310, which one of skill in the art in possession of the present disclosure will appreciated may include performing write operations to write data to the storage subsystem 310 (e.g., in response a write instruction received from the host engine 204, in response to background operations being performed in the microservice storage device 300/700, etc.), performing read operations to read data from the storage subsystem 310 (e.g., in response a read instruction received from the host engine 204, in response to background operations being performed in the microservice storage device 300/700, etc.), performing background operations using the storage subsystem 310, and/or performing any other storage subsystem management operation that would be apparent to one of skill in the art in possession of the present disclosure.

As such, one of skill in the art in possession of the present disclosure will appreciate how embodiments of the microservice storage device 700 configured as illustrated in FIG. 7B with only the storage device management microservice 710*a* may perform a variety of conventional storage device operations, while not performing the compute microservice/compute operations discussed below. However, as also discussed below, some embodiments of the present disclosure may provide a storage device management microservice that is configured to perform non-conventional storage device operations such as the zoned namespace storage subsystem/host engine interface provisioning operations described in further detail below. As such, one of skill in the art in possession of the present disclosure will appreciate that the storage device management microservice 710*a* may be configured to perform any of a variety of storage device operations while remaining within the scope of the present disclosure.

If, at decision block 504, the storage device is providing compute microservice(s), the method 500 proceeds to both blocks 506*a* and 506*b* where the storage device uses the storage device operating system to provide a storage device management microservice and compute microservice(s). In some embodiment, block 506*a* may be performed substantially as described above, while in other embodiments (described in further detail below) block 506*a* may be performed while splitting compute resources between the storage device management microservice and compute microservice(s). As such, with reference to FIG. 7C, a container management system in the microservice storage device 700 may utilize the storage device operating system 706 to perform operating-system-level virtualization operations to generate, create, and/or otherwise provide the container 710 using the storage device operating system 706, and then provide the storage device management microservice 710*a* in that container 710. Furthermore, FIG. 7C also illustrates how the container 710/storage device management microservice 710*a* allows the components of the storage device management microservice 710*a* to communicate with the storage device operating system 706, and the with storage device compute hardware 704 via a storage device compute hardware library 708 (e.g., via the respective arrows between the storage device operating system 706 and each of the communication engine 710*b*, the compute microservice provisioning engine 710*c*, and the storage subsystem control engine(s) 710*d*; as well as via the respective arrows between the storage device compute hardware library 708 and each of the communication engine 710*b*, the compute microservice provisioning engine 710*c*, and the storage subsystem control engine(s) 710*d*, and the arrow between the storage device compute hardware library 708 and the storage device compute hardware 704).

Figure 7C:
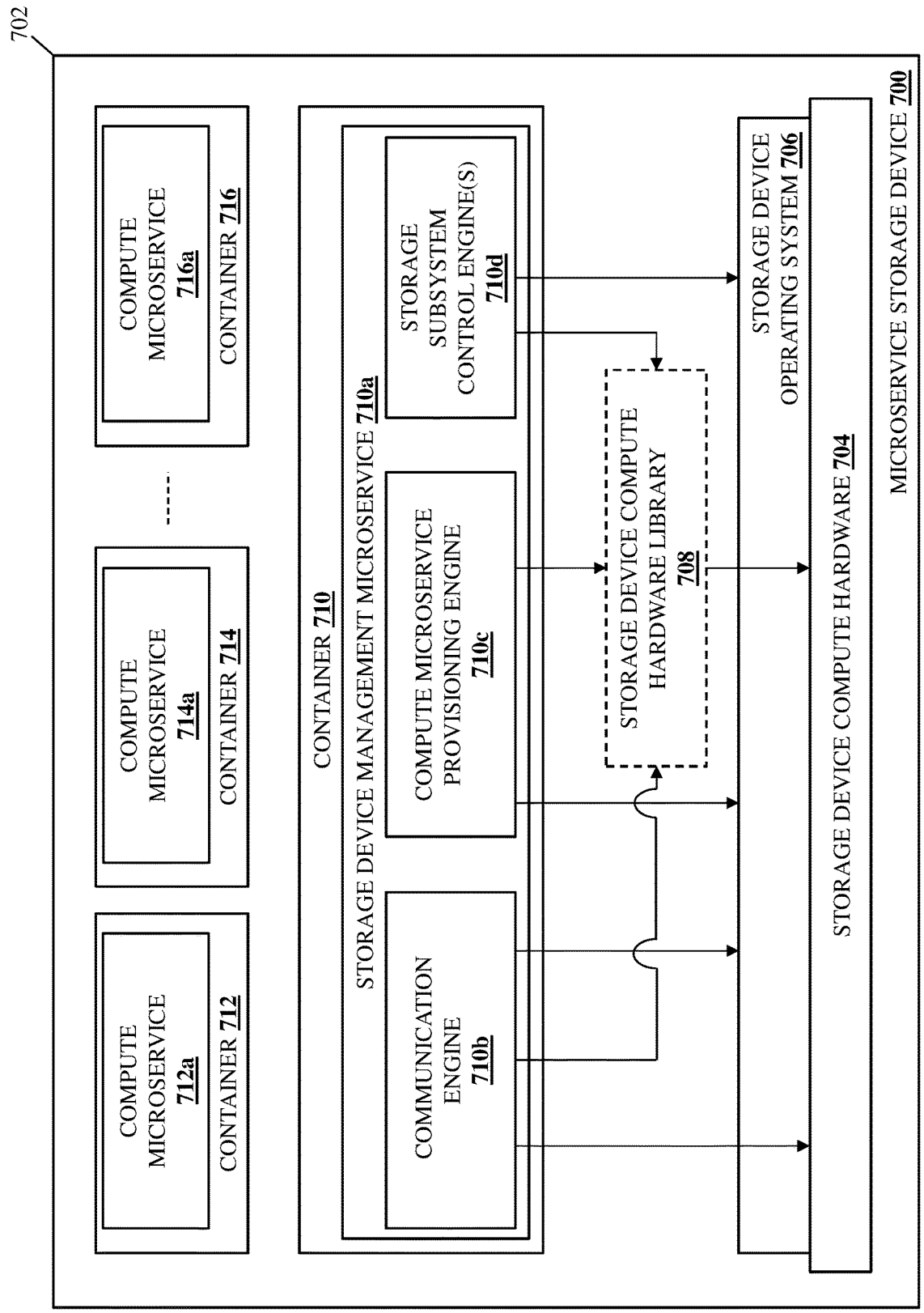
FIG. 7C is a schematic view illustrating an embodiment of the microservice storage device of FIGS. 3 and 4 operating during the method of FIG. 5.

With continued reference to FIG. 7C and the microservice storage device 700 discussed above with reference to FIG. 7A, in an embodiment of block 506*b*, the storage device operating system 706 provided using the storage device compute hardware 704 may utilize compute microservice code, instructions, or other data to provide compute microservices 712*a*, 714*a*, and up to 716*a* in the microservice storage device 700. For example, similarly as described for the storage device management microservice 710*a*, in an embodiment of block 506*b* a container management system (e.g., similar to the container management system 408 discussed above with reference to FIG. 4) may be provided in the micro service storage device 700 and may utilize the storage device operating system 706 to perform operating-system-level virtualization operations to generate, create, and/or otherwise provide containers 712, 714, and up to 716 using the storage device operating system 706, and then provide the compute microservices 712*a*, 714*a*, and 716*a* in those containers 712, 714, and up to 716, respectively, as illustrated in FIG. 7C.

Similarly as described above, the containers 712, 714, and up to 716 may be provided by respective virtual containers that package the compute microservice code, instructions, and/or other data, along with all of its dependencies, in order to allow the compute microservices 712*a*, 714*a*, and up to 716*a*, respectively, to run quickly and reliably from one computing environment to another. As such, each of the containers 712, 714, and up to 716 may provide a respective lightweight, standalone, executable package of software that includes everything needed to run its compute microservice including code information, runtime information, system tools, system libraries, settings, and/or other data that would be apparent to one of skill in the art in possession of the present disclosure. Furthermore, while not described herein in detail, the container orchestration system (e.g., similar to the container orchestration system 412 discussed above with reference to FIG. 4) that may be provided in the microservice storage device 700 as discussed above may operate to automate the compute microservice/container deployment, scaling, and management that one of skill in the art in possession of the present disclosure would recognize as providing the functionality discussed below.

As will be appreciated by one of skill in the art in possession of the present disclosure, from the point of view of the storage device operating system 706, the storage device management microservice 710*a* provided in the container 710 and the compute microservices 712*a*, 714*a*, and up to 716*a* provided in the containers 712, 714, and up to 716, respectively, may all be viewed as respective microservices (i.e., the storage device management microservice 710a may simply be viewed as a microservice that performs "storage device management" compute functions). As such, one of skill in the art in possession of the present disclosure will appreciate that the storage device operating system 706 in the microservice storage device 700 illustrated in FIG. 7C may "see" a plurality of containers 710, 712, 714, and up to 716 that each include a respective microservice.

The method 500 then proceeds to blocks 508a and 508b where the storage device uses the storage device management microservice to manage a storage subsystem in the storage device, and uses the compute microservice(s) to perform one or more compute operations. In an embodiment, at block 508a, the storage device management microservice 304/710a in the microservice storage device 300/700 may operate to manage the storage subsystem 310 and perform the storage subsystem management operations in a substantially similar manner as discussed above. As such, the storage device management microservice 710a in the microservice storage device 700 illustrated in FIG. 7C may perform write operations to write data to the storage subsystem 310, read operations to read data from the storage subsystem 310, background operations using the storage subsystem 310, and/or any other storage subsystem management operation that would be apparent to one of skill in the art in possession of the present disclosure. Furthermore, as discussed above, some embodiments of the present disclosure may configure the storage device management microservice 710a to perform non-conventional storage device operations such as the zoned namespace storage subsystem/host engine interface provisioning operations described in further detail below. As such, one of skill in the art in possession of the present disclosure will appreciate that the storage device management microservice 710a may perform any of a variety of storage device operations at block 508a while remaining within the scope of the present disclosure.

In an embodiment, at block 508b, the compute microservice provisioning engine 304b/710c in the microservice storage device 300/700 may operate to perform compute microservice provisioning operations that include providing one or more compute microservices that perform one or more compute operations. For example, the compute microservice(s) provided via the compute microservice provisioning operations may be provided by executing the compute microservice code, instructions, or other data included in their respective container to perform the one or more compute operations. However, while the compute microservices are described as being provided via the execution of compute microservice code that was previously stored in the microservice provisioning database 306, one of skill in the art in possession of the present disclosure will appreciate how the compute microservice provisioning engine 304b/710c may execute compute microservice code received and/or retrieved in other manners (e.g., compute microservice code received directly from the host engine 204, etc.) while remaining within the scope of the present disclosure as well.

As such, following blocks 508a and 508b of the method 500, the computing device 200 may be provided with one or microservice storages devices that have only been configured with the storage device management microservice discussed above, and/or one or microservice storages devices that have been configured with the storage device management microservice and one or more compute microservices discussed above. For example, with reference to FIG. 8, the computing device 200 is illustrated as including microservice storage device(s) 206a/300 each having been provided with a storage device management microservice 800a in a container 800, as well as compute microservices 802a and up to 804a provided in containers 802 and up to 804, respectively, and one of skill in the art in possession of the present disclosure will appreciate how the compute microservices 802a-804a may provide different functionality both within the microservice storage device 206a/300 and across different microservice storage devices 206a/300, while the storage device management microservices 800a may provide different functionality across different microservice storage devices 206a/300.

Figure 8:
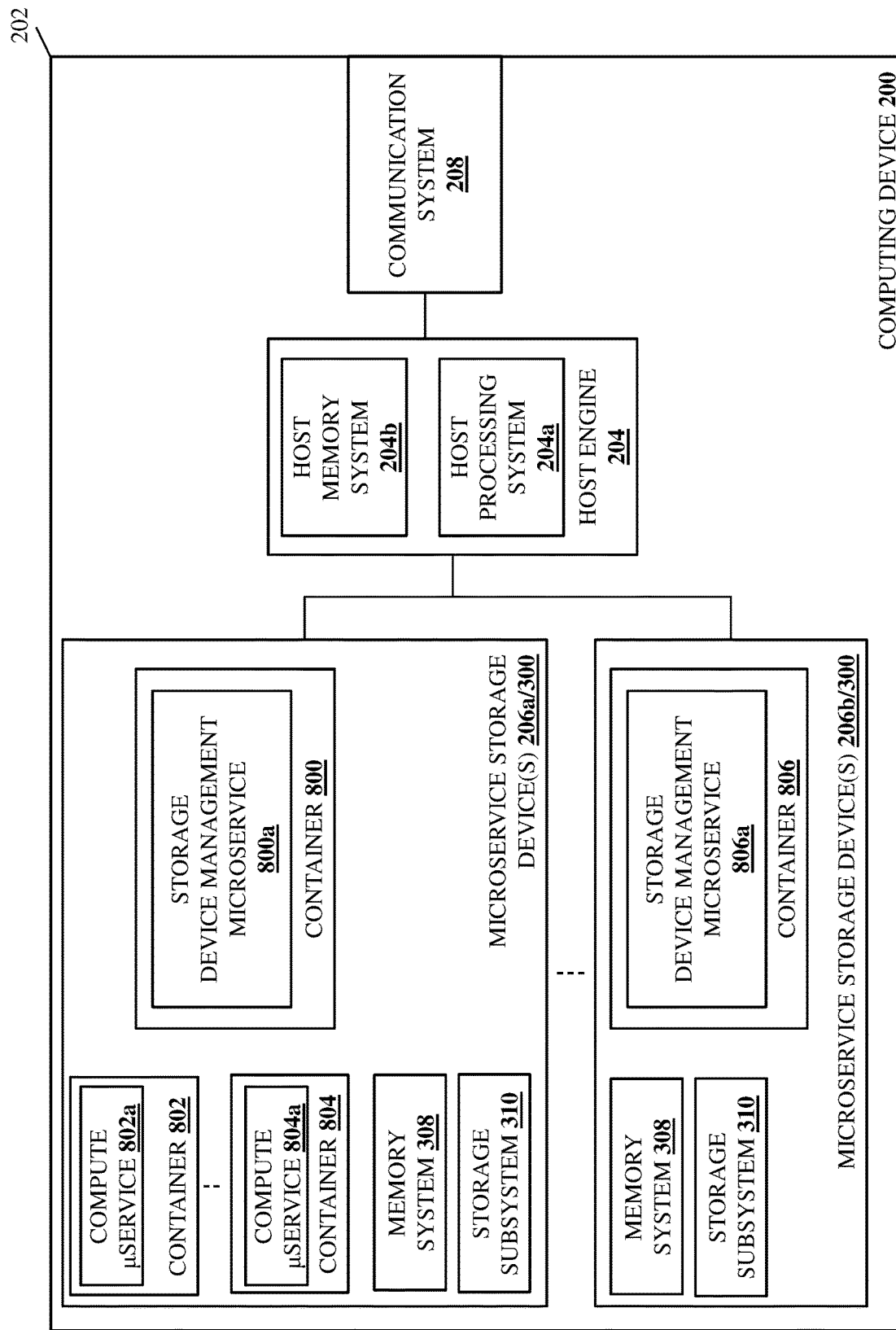
FIG. 8 is a schematic view illustrating an embodiment of the computing devices of FIG. 2 and the microservice storage devices of FIGS. 3 and 4 operating during the method of FIG. 5.

FIG. 8 also illustrates the computing device 200 as including microservice storage device(s) 206b/300 each having been provided with only a storage device management microservice 806a in a container 806, and one of skill in the art in possession of the present disclosure will appreciate how the storage device management microservices 806a may provide different functionality across different microservice storage devices 206b/300. However, while the computing device 200 is illustrated and described as including multiple different microservice storage devices with different configurations (e.g., either the storage device management microservice/compute microservice configuration or the storage-device-management-microservice-only configuration in the illustrated example), one of skill in the art in possession of the present disclosure will appreciate how the computing device 200 may include only one of the microservice storage devices illustrated in FIG. 8, or microservice storage devices having one of the configurations illustrated in FIG. 8, while remaining within the scope of the present disclosure as well.

In a specific example, the compute microservice(s) provided via the compute microservice provisioning operations may include compute microservices provided by autonomous compute signature/application combinations like those described by the inventors of the present disclosure in U.S. patent application Ser. No. 17/969,717, filed on Oct. 20, 2022; U.S. patent application Ser. No. 17/969,720, filed on Oct. 20, 2022; U.S. patent application Ser. No. 17/969,732, filed on Oct. 20, 2022; U.S. patent application Ser. No. 17/969,743, filed on Oct. 20, 2022; and U.S. patent application Ser. No. 17/969,769, filed on Oct. 20, 2022; the disclosures of which are incorporated by reference herein in their entirety. As described in those patent documents, the microservice storage device 300 may be provided with an autonomous compute signature, and data in the storage subsystem 310 that is subject to storage operations (e.g., host write operations, host read operations, storage device background operations, and/or other storage operations that involve the copying of data from the storage subsystem 310 to the memory subsystem 308) may be compared to autonomous compute signatures to determine whether it matches any of those autonomous compute signatures. In the event that data matches an autonomous compute signature, the compute microservice provisioning engine 304b (referred to as an autonomous compute storage device engine in the patent document referenced above) will execute a corresponding autonomous compute application for that autonomous compute signature in order to perform one or more compute operations associated with that data.

Figure 9:
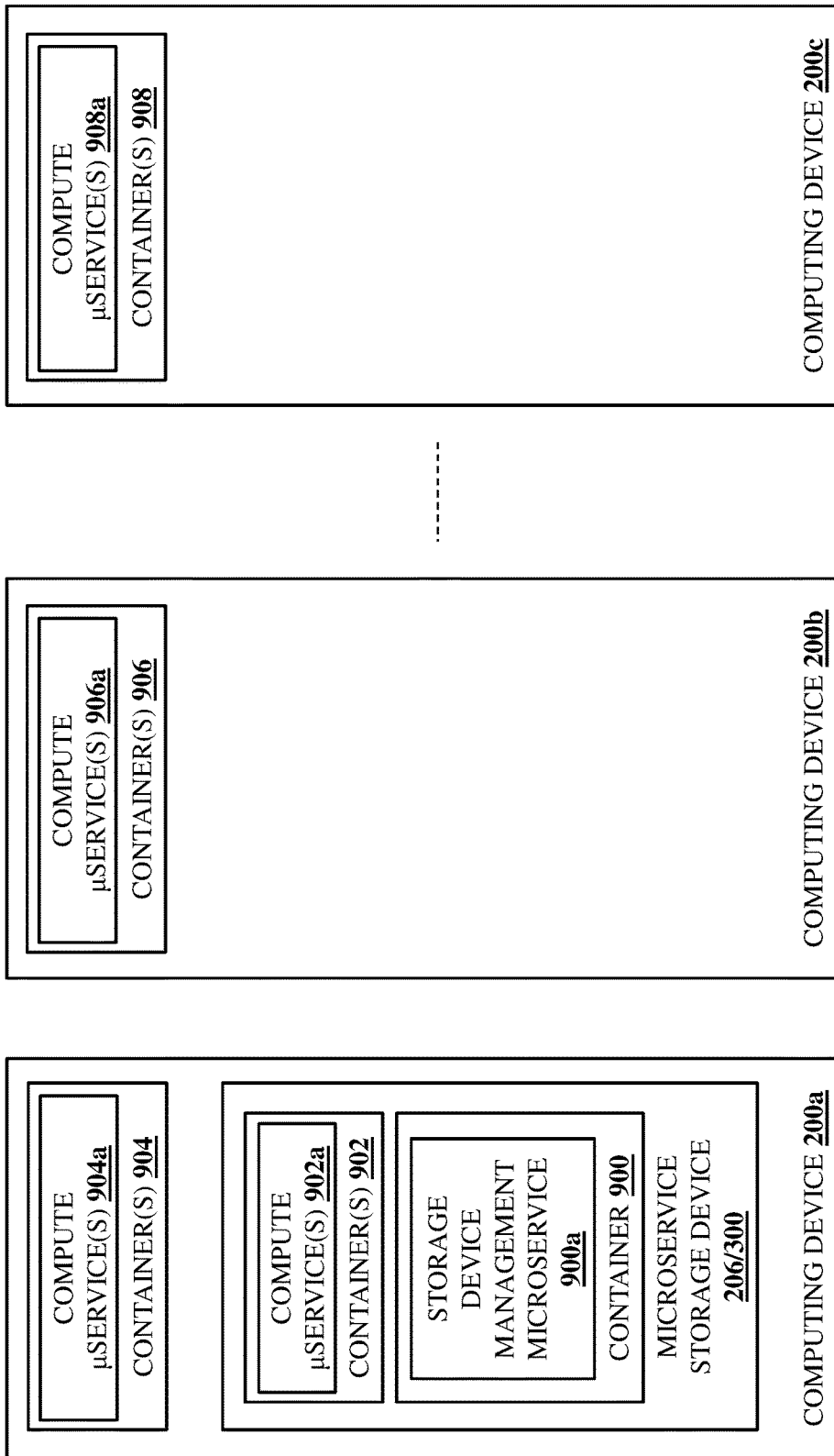
FIG. 9 is a schematic view illustrating an embodiment of a plurality of the computing devices of FIG. 2 and the microservice storage device of FIGS. 3 and 4 operating during the method of FIG. 5.

As will be appreciated by one of skill in the art in possession of the present disclosure, the compute microservice(s) provided via the compute microservice provisioning operations may include compute microservice(s) that are configured to offload the one or more compute operations from the host engine 204 and/or other components in the computing device 200. For example, with reference to FIG. 9, a plurality of computing devices 200a, 200b, and up to 200c are illustrated with a microservice storage device 206/300 included in the computing device 200a and provided with a storage device management microservice 900a in a container 900, as well as one or more compute microservices 902a in respective containers 902. As also illustrated in FIG. 9, each of the computing devices 200a, 200b, and up to 200c may provide one or more compute microservices in respective containers (e.g., via the host engine 204 in that computing device), with the computing device 200a illustrated as providing compute microservice(s) 904a in respective container(s) 904, the computing device 200b illustrated as providing compute microservice(s) 906a in respective container(s) 906, and the computing device 200c illustrated as providing compute microservice(s) 908a in respective container(s) 908.

As will be appreciated by one of skill in the art in possession of the present disclosure, a plurality of compute microservices may be configured to perform the operations of any particular application, and those compute microservices may be distributed across a plurality of different subsystems and performed by those different subsystems. As such, any of the compute microservices 902a, 904a, 906a, and 908a may operate to perform compute operations that provide the functionality for a particular application, and thus the compute microservice(s) 902a may be provided on the microservice storage device 206/300 in the computing device 200a to offload compute operations from any of the compute devices 200a, 200b, and/or 200c.

Furthermore, one of skill in the art in possession of the present disclosure will appreciate how compute microservices and/or their compute operations may be dynamically moved between the computing devices 200a, 200b, and/or 200c and the microservice storage device 206/300 in the computing device 200a in order to increase efficiency, provide higher utilization of compute resources, and/or provide other benefits that would be apparent to one of skill in the art in possession of the present disclosure. Furthermore, while only a single microservice storage device 206/300 providing compute microservices 902a is illustrated as being included in the computing device 200a, one of skill in the art in possession of the present disclosure will appreciate how one or more microservice storage devices may be provided on any or all of the computing devices 200a, 200b, and up to 200c, thus allowing microservice/compute operation migration between many more microservice storage devices than illustrated in FIG. 9, thus increasing the benefits described above.

However, while a specific example is provided, one of skill in the art in possession of the present disclosure will appreciate how the compute microservice(s) provided at block 508b may be configured to perform any compute operations that one of skill in the art in possession of the present disclosure will recognize as conventionally being performed by the host engine 204, any offload compute operations that one of skill in the art in possession of the present disclosure would recognize as offloading at least a portion of the compute operations conventionally performed by the host engine 204, and/or a variety of other offload compute operations known in the art. Furthermore, while specific examples of compute microservices and corresponding compute operations have been described, one of skill in the art in possession of the present disclosure will appreciate how other compute microservices and/or compute operations will fall within the scope of the present disclosure as well.

As will be appreciated by one of skill in the art in possession of the present disclosure, the provisioning of the storage device management microservice 304/710a and the compute microservice(s) 712a, 714a, and up to 716a using the storage device operating system 706 running on the same storage device compute hardware 704 may provide substantial benefits over conventional storage devices that utilize separate storage device compute hardware for storage device firmware (e.g., an embodiment of the storage device management microservice described herein) and other compute functionality. For example, conventional computational storage devices utilize a first processing system/memory system combination to provide its storage device firmware, and a second processing system/memory system combination that is separate from the first processing system/memory system combination to provide other compute functionality, thus increasing costs associated with those conventional computational storage devices. To contrast, the storage device operating system 706 may be configured to change allocations of the storage device compute hardware 704 to each of the storage device management microservice 304/710a and the compute microservice(s) 712a, 714a, and up to 716a as different resources are needed by any of the storage device management microservice 304/710a and the compute microservice(s) 712a, 714a, and up to 716a, which one of skill in the art in possession of the present disclosure will recognize allows the microservice storage device 300/700 to "scale" as compute microservices are added to and/or removed from the microservice storage device 300/700, as relatively hardware intensive compute microservices are developed for the microservice storage device 300/700, and/or based on any other scaling factors that would be apparent to one of skill in the art in possession of the present disclosure.

In a specific embodiment, any combination of the storage device management microservice 304/710a and the compute microservice(s) 712a, 714a, and up to 716a may share processing system resources (e.g., a storage device Central Processing Unit (CPU)) included in the storage device compute hardware 704 in the microservice storage device 300/700. For example, the storage device operation system 706 may be configured to "time-slice", schedule, and/or otherwise share the processing system resources included in the storage device compute hardware 704 between the storage device management microservice 304/710a and the compute microservice(s) 712a, 714a, and up to 716a using an operating system scheduler (e.g., a LINUX® operating system scheduler running a time slicing algorithm), although one of skill in the art in possession of the present disclosure will appreciate how other processing system sharing techniques may be utilized to share the processing system resources included in the storage device compute hardware 704 between the storage device management microservice 304/710a and the compute microservice(s) 712a, 714a, and up to 716a while remaining within the scope of the present disclosure as well.

To provide a specific example of the processing system sharing discussed above, the operating system scheduler discussed above may operate to share the processing system resources included in the storage device compute hardware 704 between the storage device management microservice 304/710a and the compute microservice(s) 712a, 714a, and up to 716a in a manner that guarantees performance of the storage device management microservice 304/710a (e.g., by dedicating one or more processing system cores to the storage device management microservice 304/710a) in order to, for example, ensure that storage device management operations provide a minimum level of storage device management performance required to operate the microservice storage device 300/700 at a threshold level. Similarly, the operating system scheduler discussed above may operate to share the processing system resources included in the storage device compute hardware 704 between the storage device management microservice 304/710a and the compute microservice(s) 712a, 714a, and up to 716a in a manner that guarantees performance of one or more of the compute microservices 712a, 714a, and up to 716a (e.g., by dedicating one or more processing system cores to the compute microservices 712a, 714a, and up to 716a) in order to, for example, ensure that compute microservice operations provide a minimum level of compute microservice performance for compute microservice(s) that perform relatively prioritized functionality. However, while several specific examples of processing system sharing have been described, one of skill in the art in possession of the present disclosure will appreciate how the processing system resources in the storage device compute hardware 704 may be shared for a variety of other purposes and in a variety of other manners while remaining within the scope of the present disclosure as well.

In another specific embodiment, any combination of the storage device management microservice 304/710a and the compute microservice(s) 712a, 714a, and up to 716a may share memory system resources (e.g., a storage device Dynamic Random Access Memory (DRAM) system) included in the storage device compute hardware 704 in the microservice storage device 300/700. As will be appreciated by one of skill in the art in possession of the present disclosure, it may be desirable to provide a memory system in the storage device compute hardware 704 of the microservice storage device 300/700 that is substantially similar to memory systems provided in conventional storage devices in order to not increase the costs of the microservice storage device that are associated with that memory system, and thus the memory system sharing discussed below may operate to address issues that may exist when a relatively limited amount of memory is available for the increased compute needs of the microservice storage device 300/700 due to the compute operation(s) performed by the compute microservice(s) described herein. However, while a specific purpose for the memory system sharing has been described, one of skill in the art in possession of the present disclosure will appreciate how the memory system sharing described below may be performed for other purposes while remaining within the scope of the present disclosure as well.

In one embodiment of the memory system sharing discussed above, the storage device management microservice 304/710a in the microservice storage device 300/700 may utilize virtual memory provided using the memory system 308 and/or the storage subsystem 310 in the microservice storage device 300/700 in order to enable sharing of the relatively limited memory space in the memory system provided in the microservice storage device 300/700. To provide a specific example, a LINUX® paging system provided by the storage device operating system 706 may be utilized to free up memory space in the memory system 308 in the microservice storage device 300/700 by writing data from the memory system 308 to the storage subsystem 310 in the microservice storage device 300/700, and allow logical-to-physical data accesses to access that data via "demand-page" operations. As will be appreciated by one of skill in the art in possession of the present disclosure, such operations will automatically adapt to data access patterns without a need provide an entire logical-to-physical memory address table in the memory system 308, but may experience performance impacts as a function of the workloads/compute operations being performed.

In another embodiment of the memory system sharing discussed above, a memory system of the computing device 200 (e.g., the host memory system 204b) may be utilized in order to enable sharing of the relatively limited memory space in the memory system provided in the microservice storage device 300/700. As will be appreciated by one of skill in the art in possession of the present disclosure, the computing device 200 may include a relatively large amount of memory space (e.g., provided by the host memory system 204b or other accessible memory systems) that may be shared with the microservice storage device 300/700. To provide a specific example, a Host Memory Buffer (HMB) (e.g., a Peripheral Component Interconnect express (PCIe) HMB) that is memory-mapped to a DRAM system in the computing device 200 may be utilized to store a logical-to-physical memory address table, and an HMB mechanism in the microservice storage device 300/700 (e.g., a Non-Volatile Memory express (NVMe) HMB mechanism) may enable access to that HMB by the microservice storage device 300/700 (e.g., via a Dual Data Rate (DDR) bus, a Compute eXpress Link (CXL) bus, etc.). As such, the HMB may be made available to any of the microservices (e.g., storage device management microservice 304/710a and the compute microservice(s) 712a, 714a, and up to 716a) provided by the microservice storage device 300/700, and may enable any non-flash compute operations performed by those microservices using the memory system (e.g., the host memory system 204b) of the computing device 200. As will be appreciated by one of skill in the art in possession of the present disclosure, such operations may allow each logical-to-physical memory address entry to be hosted in the memory system of the computing device 200, but may increase "raw" PCIe data traffic due to the "density" of the data in each logical-to-physical memory address entry, and may introduce latency per Input/Output (I/O) operation or latency per compute microservice compute operation.

In another embodiment of the memory system sharing discussed above, a Flash Translation Layer (FTL) table utilized by the storage device management microservice 304/710a may be reconfigured in order to enable sharing of the relatively limited memory space in the memory system 308 provided in the microservice storage device 300/700. For example, conventional storage device firmware in storage devices typically maps 4K FTL entries using 1 GB of DRAM per 1 TB of NAND, and the microservice storage device 300/700 may be capable of reconfiguring the FTL table to provide a relatively "coarser granularity" mapping, such as by mapping 8K FTL entries using 1 GB of DRAM per 2 TB of NAND, 16K FTL entries using 1 GB of DRAM per 4 TB of NAND, etc. As will be appreciated by one of skill in the art in possession of the present disclosure, the reconfiguration of the FTL table to a coarser granularity mapping as discussed above results in relatively fewer/smaller pointers and a correspondingly smaller FTL table, freeing up memory space in the memory system 308 of the microservice storage device 300/700 that may then be utilized by the compute microservice(s) 712a, 714a, and up to 716a.

In a specific embodiment, the microservice storage device 300/700 may be configured to have its FTL table reconfigured during deployment of the microservice storage device 300/700 in order free up memory space in the memory system 308 in the microservice storage device 300/700 for the compute microservice(s) implementation, which one of skill in the art in possession of the present disclosure will recognize may be performed as a one-time static configuration. For example, such reconfiguration may be realized by "wiping", erasing, and/or otherwise clearing the microservice storage device 300/700 of data and then reconfiguring the microservice storage device 300/700 as discussed above; using either the storage device management microservice 304/710a or the host engine 204 to copy the data in the microservice storage device 300/700 to another storage location, reconfigure the microservice storage device 300/700 as discussed above, and then copy the data back on to the microservice storage device 300/700; and/or performing other operations that one of skill in the art in possession of the present disclosure would recognize as providing for the FTL table reconfiguration discussed above.

In another specific embodiment, the storage device management microservice 304/710a may operate to reconfigure its FTL table itself during deployment of the microservice storage device 300/700 in order free up memory space in the memory system 308 in the microservice storage device 300/700 for the compute microservice(s) implementation. For example, data in the microservice storage device 300/700 may be initially organized into 4K chunks, and in response to receiving a command to reconfigure the organization of that data into 8K chunks, the storage device management microservice 304/710a may identify two consecutive 4K chunks of data that are stored separately in different physical NAND locations, and then move those 4K chunks of data such that they are located in physically consecutive NAND locations. As will be appreciated by one of skill in the art in possession of the present disclosure, such operations may be repeated for each pair of 4K chunks of data in the microservice storage device 300/700 and, for each of those pairs of 4K chunks of data, results in the need for only a single 8K pointer to the two consecutive 4K chunks of data, rather than the two 4K pointers to the two 4K chunks of data that were previously required. One of skill in the art in possession of the present disclosure will appreciate that the storage device management microservice "self-FTL-table-reconfiguration" operations discussed above may be relatively more complex than the "host-FTL-table-configuration" operations discussed above, but offers the benefit of being self-contained (and possibly implemented as a separate microservice that performs the migration/reconfiguration operations discussed above).

However, while specific examples of operations performed to enable the sharing of the memory system 308 in the microservice storage device 300/700 have been described, one of skill in the art in possession of the present disclosure will appreciate how other operations may be performed to enable the sharing of the memory system 308 in the microservice storage device 300/700 while remaining within the scope of the present disclosure as well. For example, the FTL table utilized by the storage device management microservice 304/710a as discussed above may be reconfigured with a "mixed granularity" (e.g., with portions of that FTL table mapping 4K FTL using 1 GB of DRAM per 1 TB of NAND, and portions of that FTL table mapping 8K FTL entries using 1 GB of DRAM per 2 TB of NAND) in order to free up memory space in the memory system 308 included in the microservice storage device 300/700 for use by the compute microservice(s) 712a, 714a, and up to 716a. In another example, the storage device management microservice 304/710a may be configured to perform "object store" operations that store "objects" rather than "blocks" in the memory system 308 included in the microservice storage device 300/700, and one of skill in the art in possession of the present disclosure will appreciate how the relatively larger size of objects relative to blocks will require less memory space in the FTL table utilized by the storage device management microservice 304/710a that may then be used by the compute microservice(s) 712a, 714a, and up to 716a.

Following blocks 508a or blocks 508a and 508b, the method 500 then proceeds to decision block 510 where the method 500 proceeds depending on whether the storage device requires reconfiguration. In some embodiments, the microservice storage devices of the present disclosure may be reconfigurable to change their configuration (e.g., between the storage-device-management-engine-only configuration and the storage device management microservice/compute microservice configuration discussed above). As such, in an embodiment of decision block 510, the method 500 may continue to perform block 508a and/or blocks 508a/508b as long as the microservice storage device 300/700 does not require reconfiguration. However, in the event the microservice storage device requires reconfiguration, the method 500 may return to decision block 504. As such, the method 500 may repeat starting at decision block 504 in order to reconfigure the microservice storage device 300/700 from the storage-device-management-microservice-only configuration discussed above to the storage device management microservice/compute microservice configuration discussed above, or from the storage device management microservice/compute microservice configuration discussed above to the storage-device-management-microservice-only configuration discussed above.

Figure 10A:
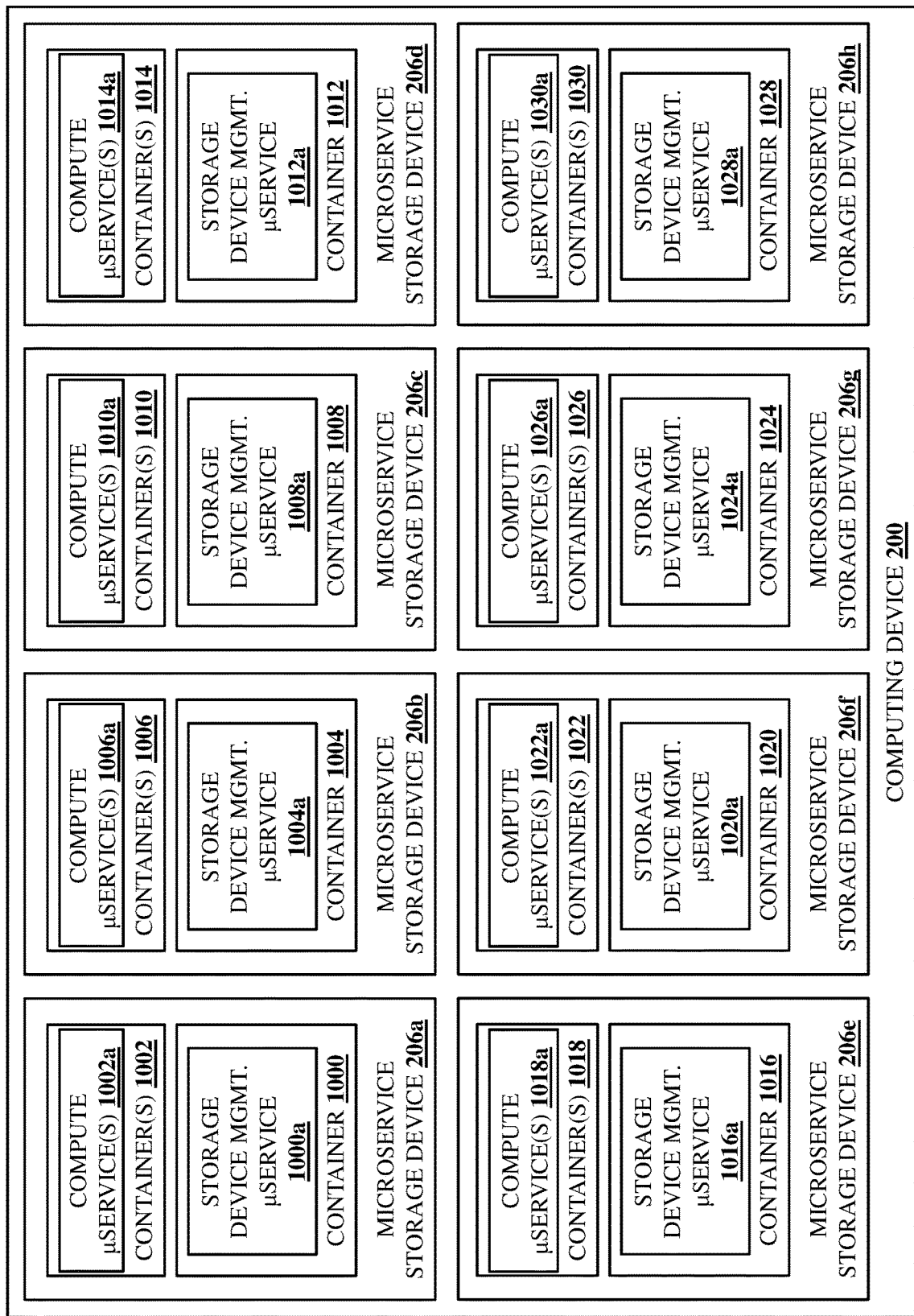
FIG. 10A is a schematic view illustrating an embodiment of the computing device of FIG. 2 including a plurality of the microservice storage devices of FIGS. 3 and 4 operating during the method of FIG. 5.

To provide an example of the reconfiguration of microservice storage devices in a computing device, FIG. 10A illustrates a computing device 200 includes a plurality of microservice storage devices 206a, 206b, 206c, 206d, 206e, 206f, 206g, and 206h. In the illustrated, the microservice storage device 206a has been provided with a storage device management microservice 1000a in a container 1000 and one or more compute microservices 1002a in respective containers 1002, the microservice storage device 206b has been provided with a storage device management microservice 1004a in a container 1004 and one or more compute microservices 1006a in respective containers 1006, the microservice storage device 206c has been provided with a storage device management microservice 1008a in a container 1008 and one or more compute microservices 1010a in respective containers 1010, the microservice storage device 206d has been provided with a storage device management microservice 1012a in a container 1012 and one or more compute microservices 1014a in respective containers 1014, the microservice storage device 206e has been provided with a storage device management microservice 1016a in a container 1016 and one or more compute microservices 1018a in respective containers 1018, the microservice storage device 206f has been provided with a storage device management microservice 1020a in a container 1020 and one or more compute microservices 1022a in respective containers 1022, the microservice storage device 206g has been provided with a storage device management microservice 1024a in a container 1024 and one or more compute microservices 1026a in respective containers 1026, and the microservice storage device 206h has been provided with a storage device management microservice 1028a in a container 1028 and one or more compute microservices 1030a in respective containers 1030.

Figure 10B:
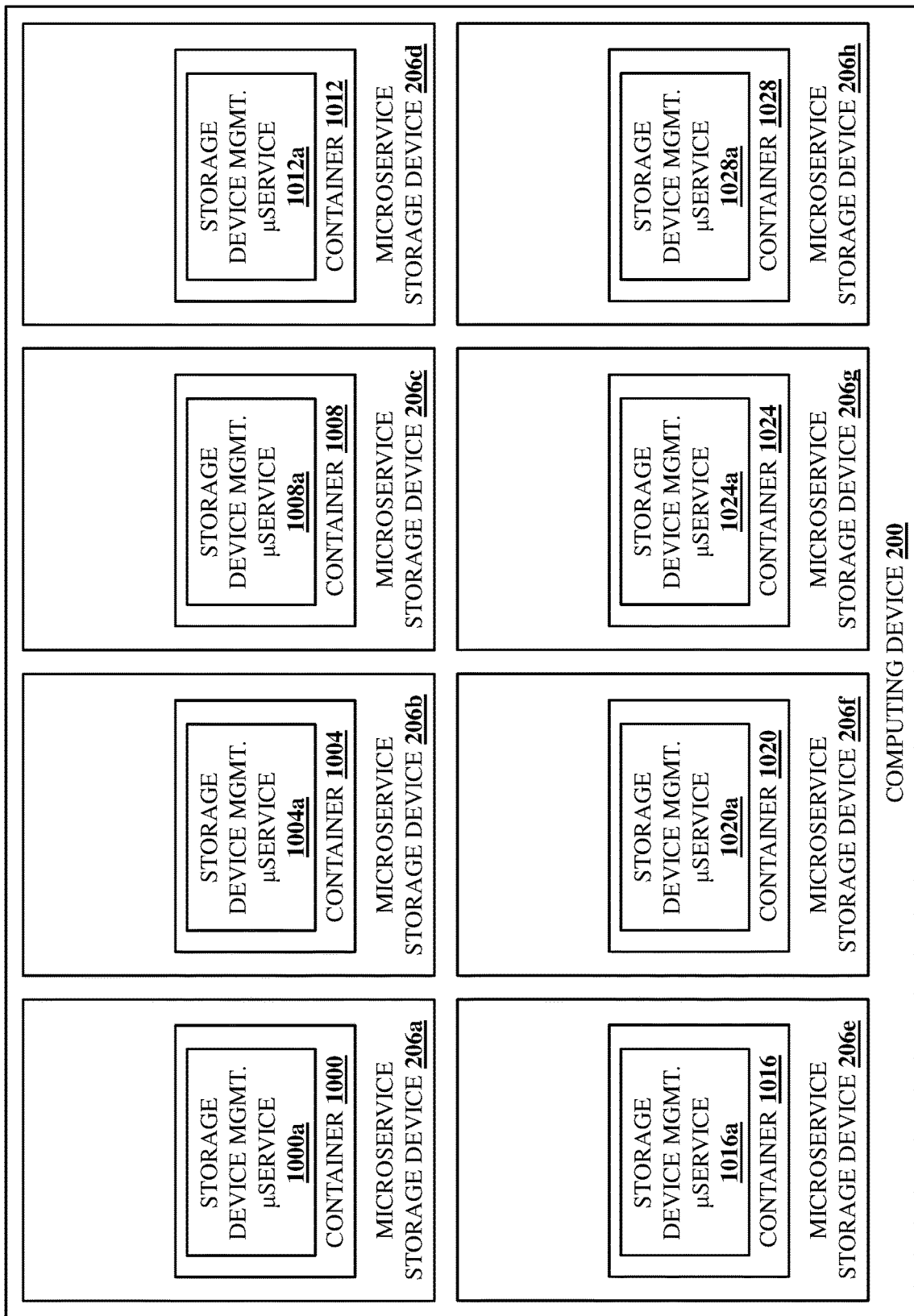
FIG. 10B is a schematic view illustrating an embodiment of the computing device of FIG. 2 including a plurality of the microservice storage devices of FIGS. 3 and 4 operating during the method of FIG. 5.

As will be appreciated by one of skill in the art in possession of the present disclosure, the configurations of each the microservice storage devices 206a-206h illustrated in FIG. 10A may have been provided as per the performance of the method 500 substantially as described above. Subsequently, any of the microservice storage devices 206a-206h may be reconfigured per a subsequent performance of the method 500 and in substantially the same manner as described above. For example, FIG. 10B illustrates reconfiguration of the microservice storage device 206a of FIG. 10A to remove the compute microservice(s) 1002a such that it is only provided with the storage device management microservice 1002a in the container 1000, reconfiguration of the microservice storage device 206b of FIG. 10A to remove the compute microservice(s) 1006a such that it is only provided with the storage device management microservice 1004a in the container 1004, reconfiguration of the microservice storage device 206c of FIG. 10A to remove the compute microservice(s) 1010a such that it is only provided with the storage device management microservice 1008a in the container 1008, reconfiguration of the microservice storage device 206d of FIG. 10A to remove the compute microservice(s) 1014a such that it is only provided with the storage device management microservice 1012a in the container 1012, reconfiguration of the microservice storage device 206e of FIG. 10A to remove the compute microservice(s) 1018a such that it is only provided with the storage device management microservice 1016a in the container 1016, reconfiguration of the microservice storage device 206f of FIG. 10A to remove the compute microservice(s) 1022a such that it is only provided with the storage device management microservice 1020a in the container 1020, reconfiguration of the microservice storage device 206g of FIG. 10A to remove the compute microservice(s) 1026a such that it is only provided with the storage device management microservice 1024a in the container 1024, and reconfiguration of the microservice storage device 206h of FIG. 10A to remove the compute microservice(s) 1030a such that it is only provided with the storage device management microservice 1028a in the container 1028.

Figure 10C:
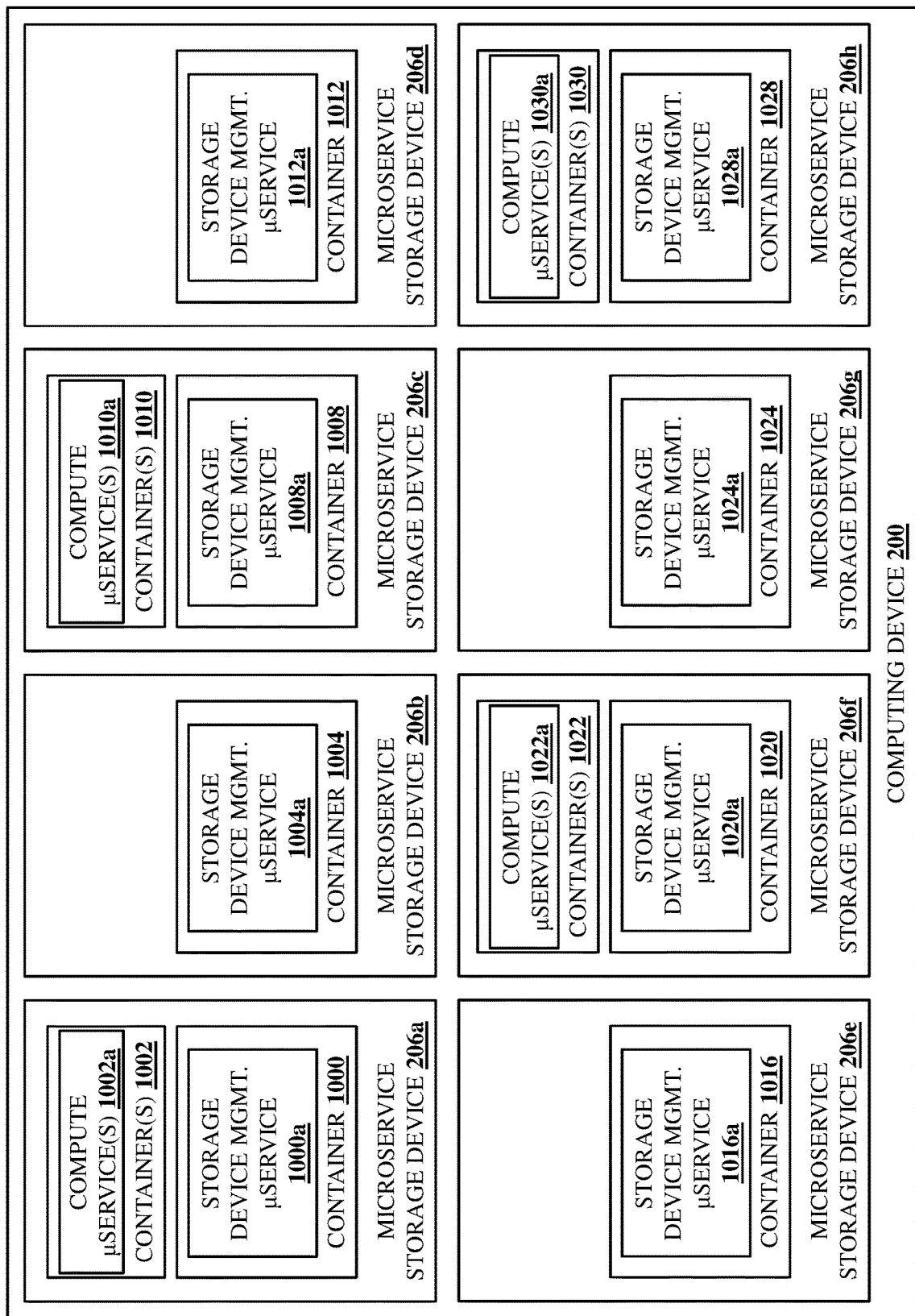
FIG. 10C is a schematic view illustrating an embodiment of the computing device of FIG. 2 including a plurality of the microservice storage devices of FIGS. 3 and 4 operating during the method of FIG. 5.

In another example, FIG. 10C illustrates reconfiguration of the microservice storage device 206b of FIG. 10A to remove the compute microservice(s) 1006a such that it is only provided with the storage device management microservice 1004a in the container 1004, reconfiguration of the microservice storage device 206d of FIG. 10A to remove the compute microservice(s) 1014a such that it is only provided with the storage device management microservice 1012a in the container 1012, reconfiguration of the microservice storage device 206e of FIG. 10A to remove the compute microservice(s) 1018a such that it is only provided with the storage device management microservice 1016a in the container 1016, and reconfiguration of the microservice storage device 206g of FIG. 10A to remove the compute microservice(s) 1026a such that it is only provided with the storage device management microservice 1024a in the container 1024. However, while a specific configuration and two possible reconfigurations have been illustrated and described, one of skill in the art in possession of the present disclosure will appreciate how multiple microservice storage devices in a computing device that are provided according to the teachings of the present disclosure may be configured and reconfigured in any of a variety of manners (e.g., as an application profile in the computing device (or a plurality of computing devices) changes) while remaining within the scope of the present disclosure as well.

Thus, systems and methods have been described that provide a storage device management microservice (e.g., storage device firmware that manages a storage subsystem) and one or more compute microservices (e.g., that perform compute operations) in a storage device using the same storage device compute hardware (e.g., a storage device controller). For example, the microservice storage device system of the present disclosure may include a computing device. An NVMe SSD storage device is located in the computing device and includes NVMe SSD storage device compute hardware coupled to a NAND storage subsystem that is configured to store data. The NVMe SSD storage device uses the NVMe SSD storage device compute hardware to provide a storage device operating system. The NVMe SSD storage device then uses the storage device operating system to provide an SSD controller microservice that it uses to manage the NAND storage subsystem. The NVMe SSD storage device also uses the storage device operating system to provide at least one compute microservice that it uses to perform at least one compute operation. The SSD controller microservice and the at least one compute microservice may each be provided in a respective container generated by the storage device operating system for each of the SSD controller microservice and the at least one compute microservice. As such, the system and methods described below provides benefits over conventional storage devices that utilize separate storage device compute hardware (a first processing/memory subsystem and a second processing/memory subsystem) to provide storage device firmware and to perform conventional compute operation, including (but not limited to) the ability to change storage device compute hardware allocations between the storage device management microservice and compute micro s ervice(s).

Figure 11:
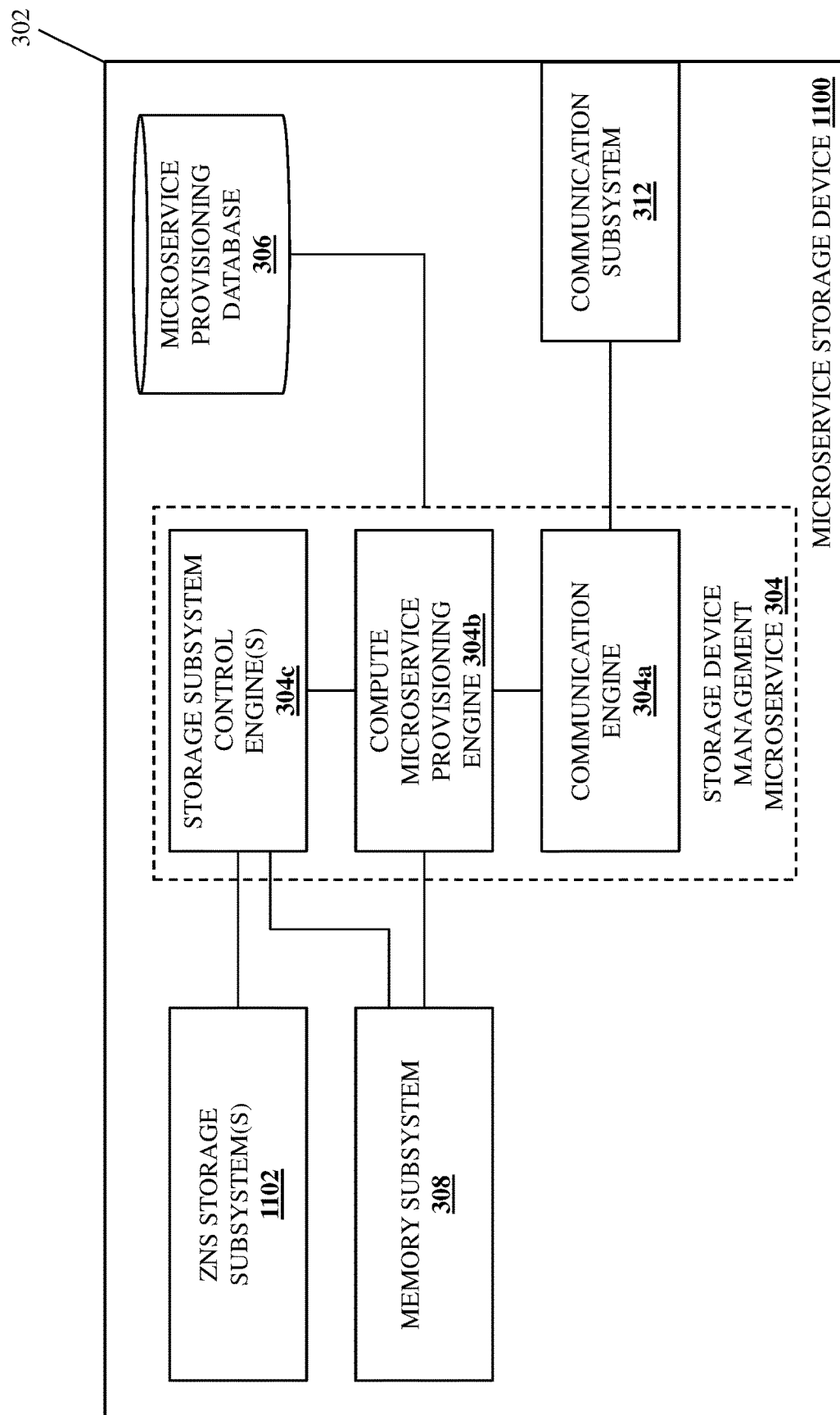
FIG. 11 is a schematic view illustrating an embodiment of a microservice storage device that may be included in the zoned namespace storage device system provided according to the teachings of the present disclosure.

With reference to FIG. 11, an embodiment of a microservice storage device 1100 is illustrated that may be included in a zoned namespace storage device system provided according to the teachings of the present disclosure. As discussed above, in some embodiments the microservice storage device of the present disclosure may be configured to provide a storage device management microservice that performs non-conventional functionality that may include operating as an interface between a host subsystem and a zoned namespace storage subsystem, and the microservice storage device 1100 provides an example of such a configuration. However, while the storage device management microservice that operates as an interface between a host subsystem and a zoned namespace storage subsystem according to the teachings of the present disclosure is described below as being provided in a container and as a microservice per the teachings above, one of skill in the art in possession of the present disclosure will appreciate how the storage device management microservice that operates as an interface between a host subsystem and a zoned namespace storage subsystem according to the teachings of the present disclosure may be provided in conventional manners or other manners (i.e., without the need for the container or microservice) while remaining within the scope of the present disclosure as well.

In the illustrated embodiments, the microservice storage device 1100 is similar to the microservice storage device 300 discussed above with reference to FIG. 3, and thus similar elements have been provided with similar numbers. As such, the microservice storage device 1100 illustrated in FIG. 11 includes the chassis 302 housing a storage device processing system/storage device memory system that provide the storage device management microservice 304 including the communication engine 304a, the compute microservice provisioning engine 304b, and the storage subsystem control engine(s) 304c; the storage system that provides the microservice provisioning database 306; the memory subsystem 308; and the communication system 312. In addition, the chassis 302 of the microservice storage device 1100 includes one or more Zoned NameSpace (ZNS) storage subsystems 1102 that provide the storage subsystem(s) 310 discussed above with reference to FIG. 3, and that may be coupled to the storage device management microservice 304 via a Peripheral Component Interconnect express (PCIe) interface. As such, specific embodiments of the microservice storage device 1100 may include an NVMe ZNS SSD storage device, although other storage device technologies may benefit from the teachings of the present disclosure and thus will fall within its scope as well.

As will be appreciated by one of skill in the art in possession of the present disclosure, embodiments of ZNS storage devices and/or ZNS storage subsystems may be configured to group their storage capacity into zones that may each be read in any order but that must be written sequentially, which allow those ZNS storage devices and/or ZNS storage subsystems to improve internal data placement and provide relatively higher endurance via reduced write amplification and increased capacity. For example, the zone abstraction of the storage capacity discussed above may allow a host subsystem to align write operations to the sequential-write-requirements of flash-based SSD storage devices, thus optimizing the placement of data on the ZNS storage subsystem. As will be appreciated by one of skill in the art in possession of the present disclosure, ZNS storage devices and/or ZNS storage subsystems address issues with conventional FTL storage device management operations that operate to shift storage sectors each time new data is written to the storage subsystem, resulting in a phenomenon called "write amplification" that occurs due to the need to write and rewrite data repeatedly through the garbage collection background process, wearing down the storage subsystem and reducing its reliability over time. Furthermore, one of skill in the art in possession of the present disclosure will recognize how ZNS storage devices and/or ZNS storage subsystems also reduce the need for "over-provisioning" (i.e., reserving storage capacity to allow data to be moved during the garbage collection background process) at the individual storage device level, and provide other benefits as well.

As will be appreciated by one of skill in the art in possession of the present disclosure, ZNS storage devices and/or ZNS storage subsystems may provide relatively less expensive storage device relative to conventional storage devices and storage subsystems via their use of relatively inexpensive storage technologies such as Quad-Level Cell (QLC) flash memory devices, the reduction or elimination of over-provisioning, as well as the elimination of non-essential storage components and/or functionality that then is often conventionally provided by the host subsystem (if that functionality is desired/required). For example, ZNS storage devices and/or ZNS storage subsystems do not provide the block storage services that are conventionally utilized by conventional host subsystems, and rather provide a zone storage service, thus requiring that a software stack in the conventional host subsystem be modified to utilize the zone storage service provided by the ZNS storage devices and/or ZNS storage subsystems.

In another example, ZNS storage devices and/or ZNS storage subsystems may not perform data error preparation, data error correction, and/or other data error recovery operations that are conventionally performed by conventional storage devices and/or storage subsystems and relied on by conventional host subsystems storing data therein, thus requiring that such error recovery operations be performed in the conventional host subsystem, often resulting in a relatively higher presumed error rate. In yet another example, ZNS storage devices and/or ZNS storage subsystems may not include persistent memory subsystems and thus may not perform persistent storage operations for data that are conventionally performed by storage devices and/or storage subsystems and relied on by conventional host subsystems storing data therein, thus requiring that such persistent storage operations be performed in the conventional host subsystem for data that is being stored in the ZNS storage devices and/or ZNS storage subsystems, extending the time required to complete write operations and requiring a host write buffer in the memory system (e.g., DRAM) in the conventional host subsystem. However, while a few specific examples have been provided, one of skill in the art in possession of the present disclosure will appreciate how the ZNS storage sub system(s) 1102 may be provided in a relatively inexpensive manner while eliminating other components and/or functionality (i.e., other than NAND memory device and the components required to allow data to be stored thereon) while remaining within the scope of the present disclosure.

Figure 12:
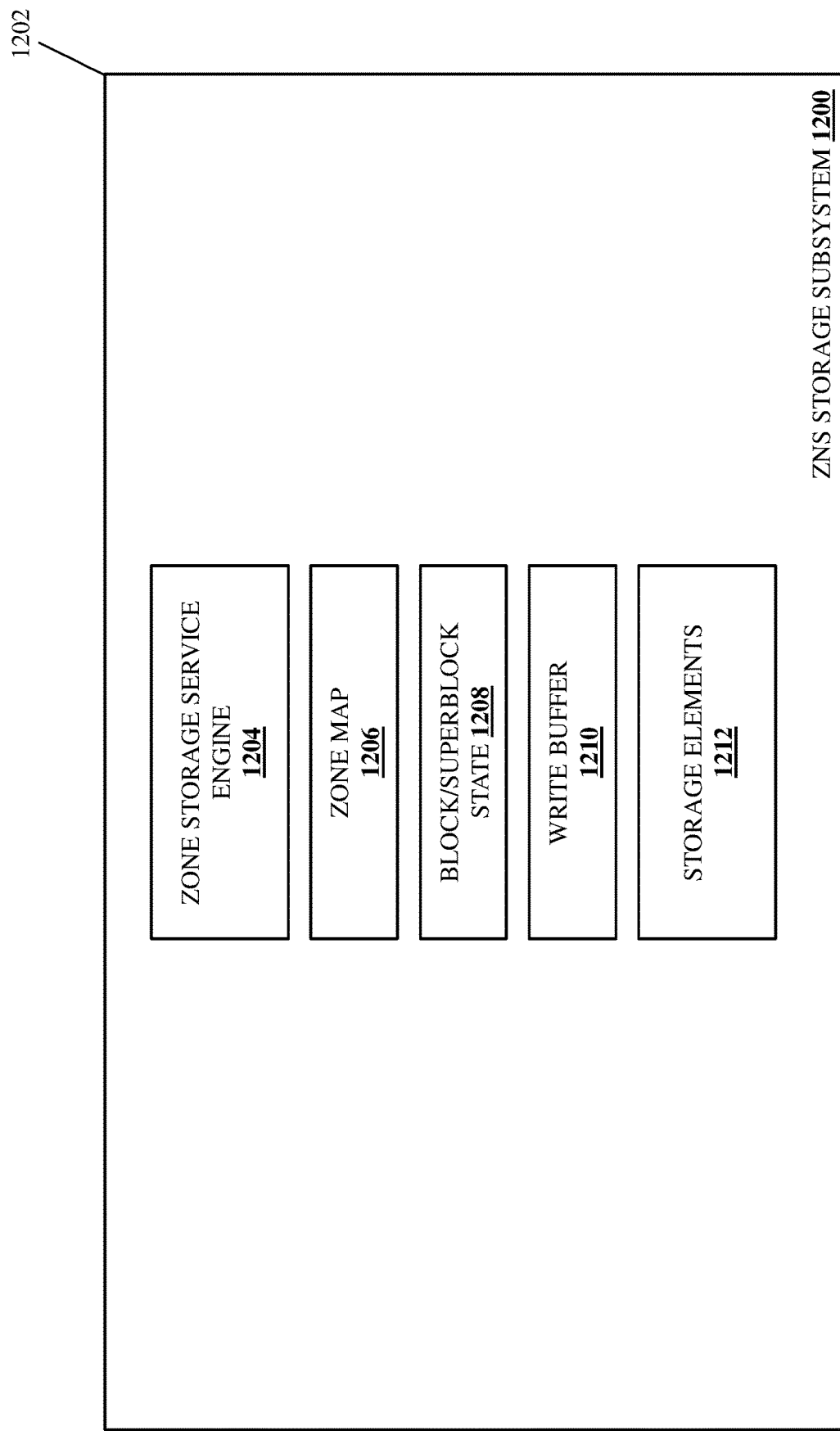
FIG. 12 is a schematic view illustrating an embodiment of a zoned namespace storage subsystem that may be included in the microservice storage device of FIG. 11.

With reference to FIG. 12, an embodiment of a Zoned NameSpace (ZNS) storage subsystem 1200 is illustrated that may provide the ZNS storage subsystem 1102 discussed above with reference to FIG. 11. In the illustrated embodiment, the ZNS storage subsystem 1200 includes a chassis 1202 (e.g., a circuit board or other storage subsystem support structure) that supports the components of the ZNS storage subsystem 1200, only some of which are illustrated and described below. For example, the chassis 1202 may support a processing system and a memory subsystem that includes instructions that, when executed by the processing system, cause the processing system to provide a zone storage service engine 1204 that is configured to provide the zone storage service and/or perform any of the other functionality described for the ZNS storage subsystems described below. In a specific example, the zone storage service engine 1204 may be provided by a storage subsystem controller that includes the processing system/memory system combination described above, although one of skill in the art in possession of the present disclosure will appreciate how other processing system/memory system combinations may provide the zone storage service engine 1204 while remaining within the scope of the present disclosure as well.

In the illustrated embodiment, the chassis 1202 may also support a memory system, storage system, register system, and/or other data storage structure that stores a zone map 1206, a block/superblock state 1208, a write buffer 1210, as well as any other information that one of skill in the art in possession of the present disclosure would recognize as allowing the ZNS storage subsystem 1200 to perform any of a variety of ZNS storage operations known in the art. The chassis 1202 may also support a plurality of storage elements 1212 such as, for example, NAND storage elements that may be provided in an array and grouped into "superblocks" or other logical storage structures that would be apparent to one of skill in the art in possession of the present disclosure and that are configured to store data in the ZNS storage subsystem 1200. However, while a specific ZNS storage subsystem has been illustrated and described, one of skill in the art in possession of the present disclosure will appreciate how the ZNS storage subsystem of the present disclosure may include other components and/or components configurations while remaining within the scope of the present disclosure as well.

Figure 13:
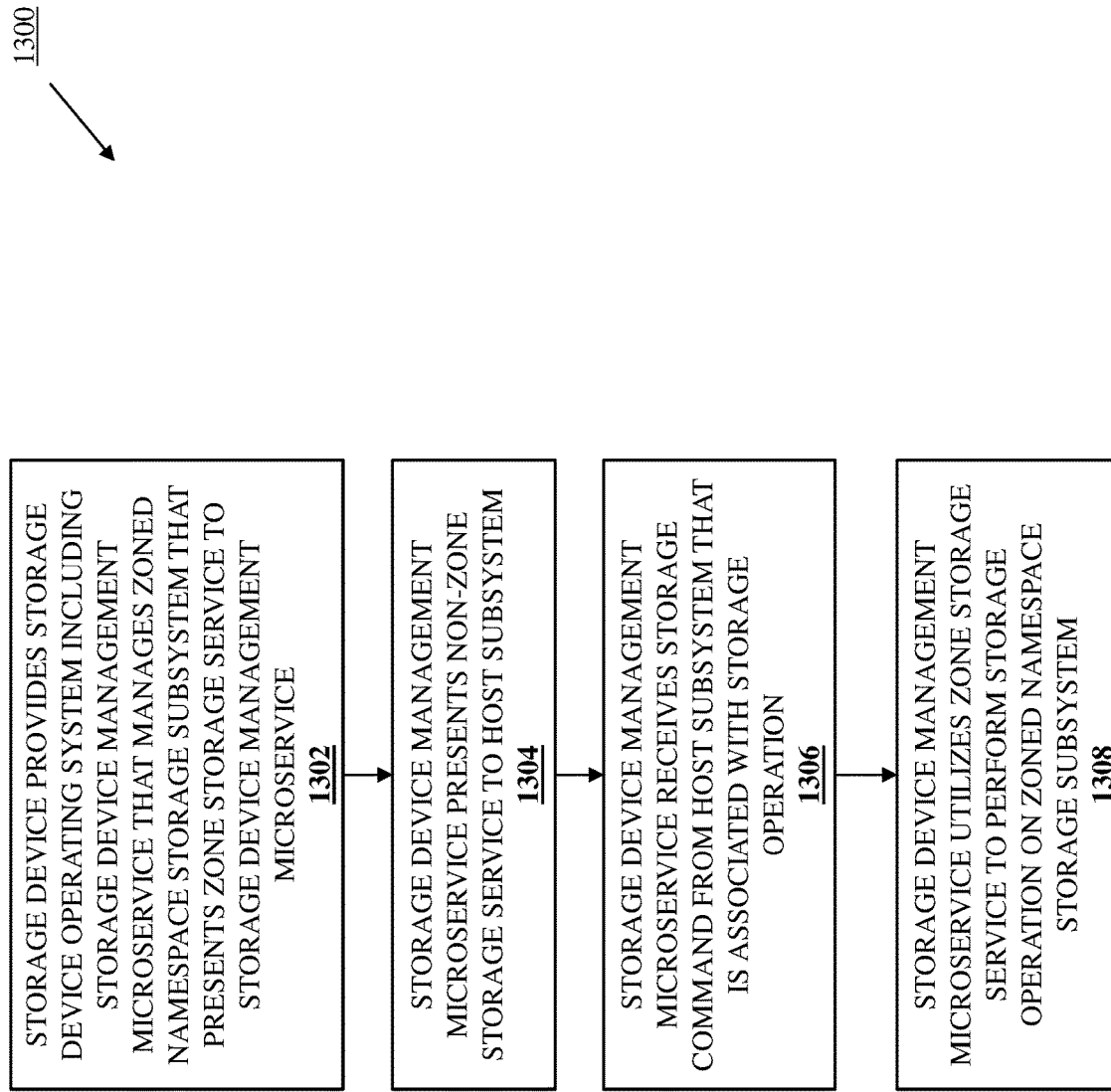
FIG. 13 is a flow chart illustrating an embodiment of a method for providing a zoned namespace storage device.

With reference to FIG. 13, an embodiment of a method 1300 for providing a zoned namespace storage device is illustrated. As discussed below, the systems and methods of the present disclosure provide a storage device management microservice in a storage device that interfaces between a host subsystem coupled to the storage device and a zoned namespace storage subsystem included in the storage device in order to perform storage operations, which were instructed by the host subsystem via a non-zone storage service presented by the storage device management microservice to the host subsystem, using a zone storage service presented by the zoned namespace storage subsystem to the storage device management microservice. For example, the zoned namespace storage device system of the present disclosure may include a zoned namespace storage device coupled to a computing device. The zoned namespace storage device includes a zoned namespace storage subsystem that is configured to store data, and storage device compute hardware that is coupled to the zoned namespace storage subsystem and that is configured to provide a storage device operating system that includes a storage device management microservice. The storage device management microservice presents a non-zone storage service to a host subsystem in the computing device and receives, via the non-zone storage service presented to the host subsystem, a storage command from the host subsystem that is associated with a storage operation. The storage device management microservice then utilizes a zone storage service presented to the storage device management microservice by the zoned namespace storage subsystem to perform the storage operation on the zoned namespace storage subsystem. As such, the zoned namespace storage subsystem may be utilized by different host subsystems without requiring modification to those host subsystems.

Figure 14:
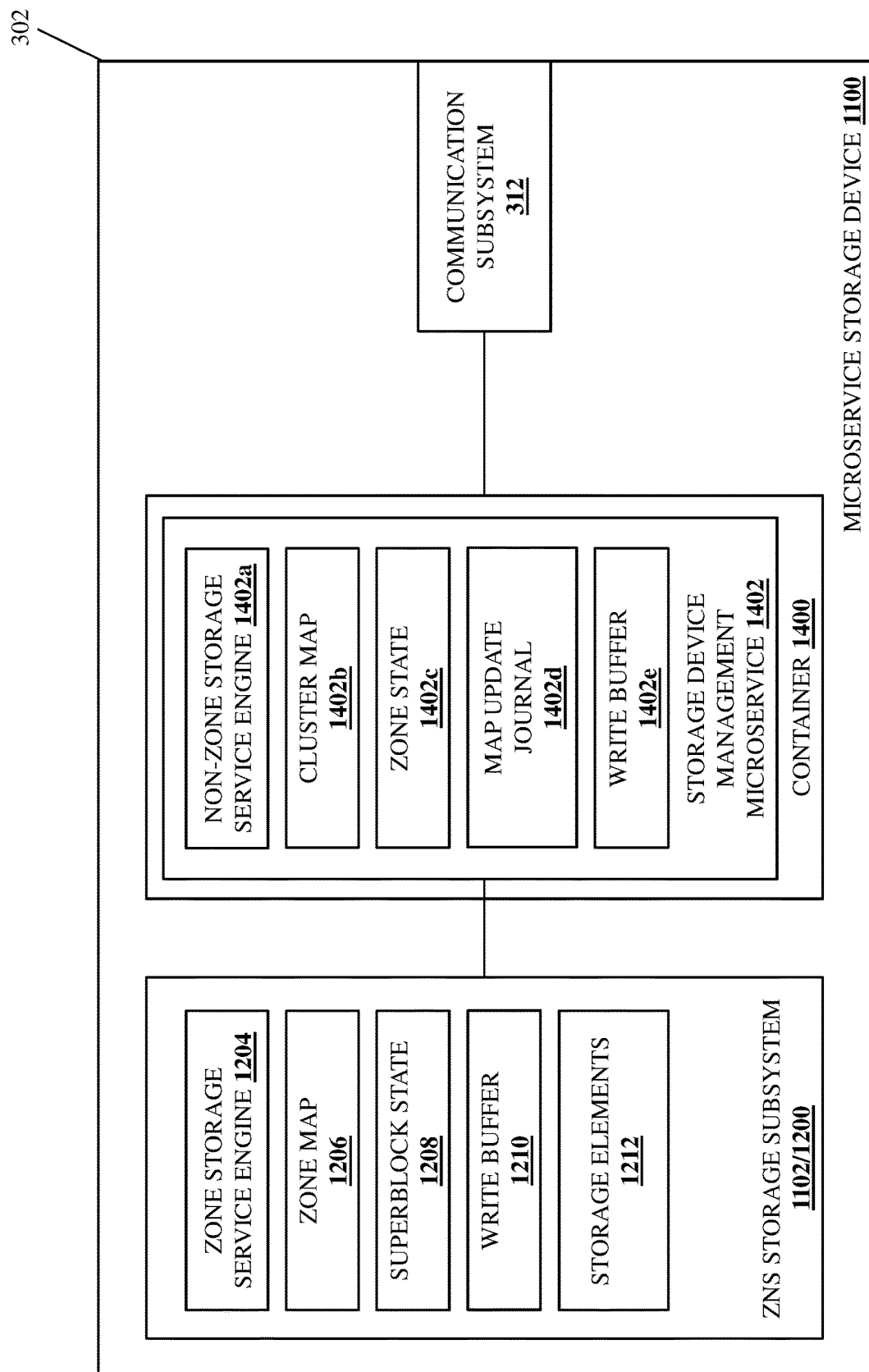
FIG. 14 is a schematic view illustrating an embodiment of the microservice storage device of FIG. 11 operating during the method of FIG. 13.

The method 1300 begins at block 1302 where a storage device provides a storage device operating system including a storage device management microservice that manages a zoned namespace storage subsystem that presents a zone storage service to the storage device management microservice. With reference to FIG. 14, the microservice storage device 1100 may be provided with the ZNS storage subsystem 1102/1200 described above that include the zone storage service engine 1204, the zone map 1206, the block/superblock state 1208, the write buffer 1210, and the storage elements 1212 described above with reference to FIG. 12. However, while only a single ZNS storage subsystem 1102/1200 is illustrated and described in this example of the method 1300 provided below, as discussed below other ZNS storage subsystems may be included in the microservice storage device 1100 while remaining within the scope of the present disclosure as well.

Furthermore, FIG. 14 also illustrates how, in an embodiment of block 1302, storage device compute hardware in the microservice storage device 1100 may be utilized to provide a storage device operating system (e.g., similarly as described for the storage device compute hardware 704 providing the storage device operating system 706 in the microservice storage device 700 discussed above with reference to FIG. 7B), with that storage device operating system used to provide a container 1400 that includes a storage device management microservice 1402 (e.g., similarly as described for the storage device operating system 706 providing the container 710 that includes the storage device management microservice 710a in the microservice storage device 700 discussed above with reference to FIG. 7B). However, while illustrated and described as being provided in a container and via a "storage device management microservice" similarly as described above, one of skill in the art in possession of the present disclosure will appreciate how embodiments of the present disclosure may provide the storage device management microservice 1402 in a conventional manner (e.g., as part of storage device firmware) while configuring that storage device management microservice 1402 to perform the non-conventional host subsystem/ZNS storage subsystem interface functionality described below while remaining within the scope of the present disclosure as well.

In the illustrated embodiment, the storage device management microservice 1402 is configured to provide a non-zone storage service engine 1402a. For example, the compute microservice provisioning engine 304b in the storage device management microservice 304/1402 may execute storage device management microservice code, instructions, or other data that is configured to cause the compute microservice provisioning engine 304b to provide the non-zone storage service engine 1402a that is configured to perform the non-zone storage service operations as part of the storage device management microservice 1402 described below. To provide a few specific examples, the non-zone storage service may include a block storage service, an object storage service, a file storage service, and/or other non-zone storage services that would be apparent to one of skill in the art in possession of the present disclosure.

Furthermore, the storage device management microservice 1402 be provided by a memory system, storage system, register system, and/or other data storage structure that stores a cluster map 1402a, a zone state 1402c, a map update journal 1402d, a write buffer 1402e, as well as any other information that one of skill in the art in possession of the present disclosure would recognize as allowing the storage device management microservice 1402 to perform any of functionality described below. However, while particular elements of the storage device management microservice 1402 that enable embodiments of the host subsystem/ZNS storage subsystem interface functionality of the present disclosure have been illustrated and described, one of skill in the art in possession of the present disclosure will appreciate how the storage device management microservice 1402 may include other elements that enable management of the ZNS storage subsystem 1102/1200 while remaining within the scope of the present disclosure as well.

Figure 15A:
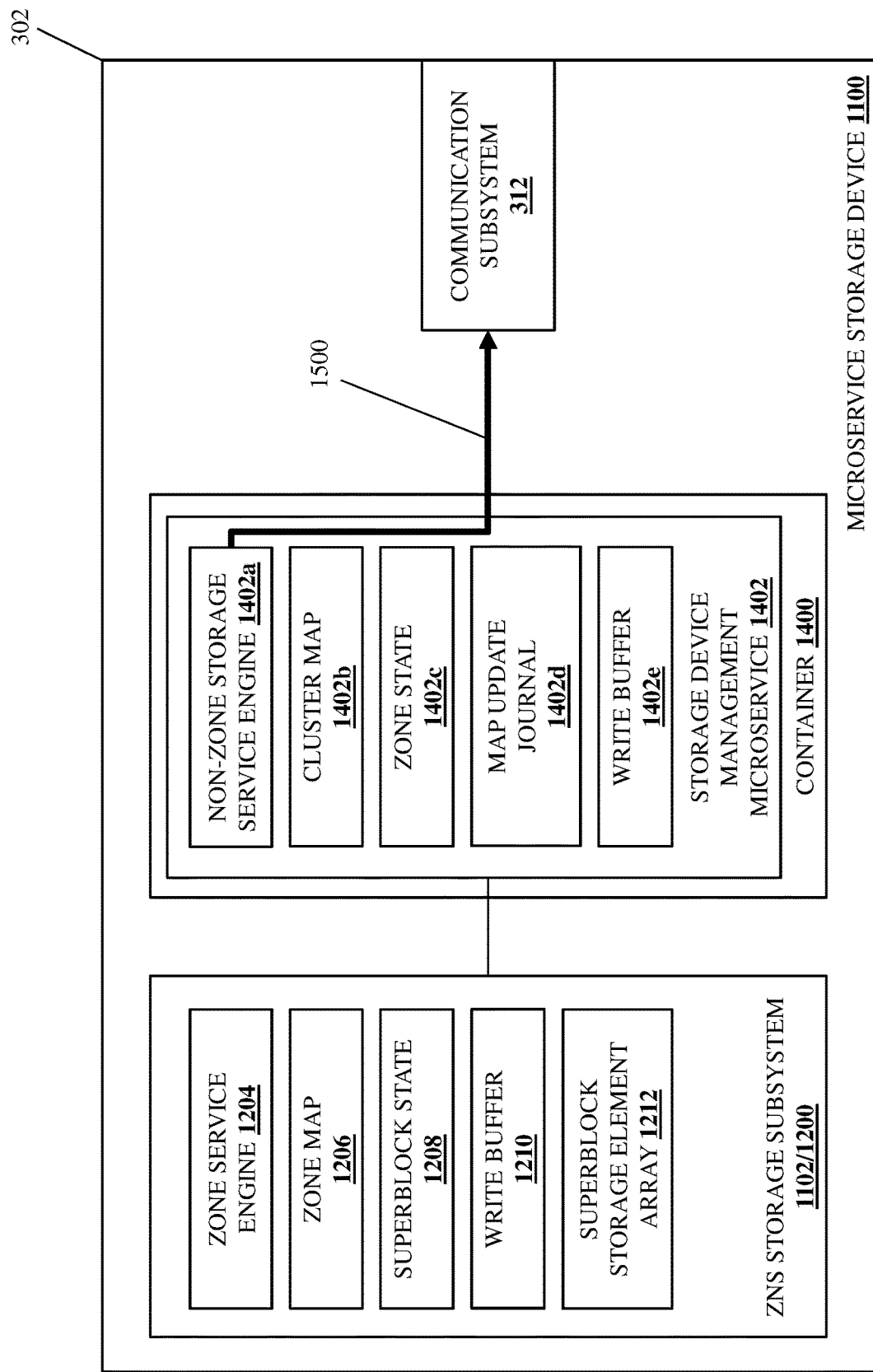
FIG. 15A is a schematic view illustrating an embodiment of the microservice storage device of FIG. 11 operating during the method of FIG. 13.
Figure 15B:
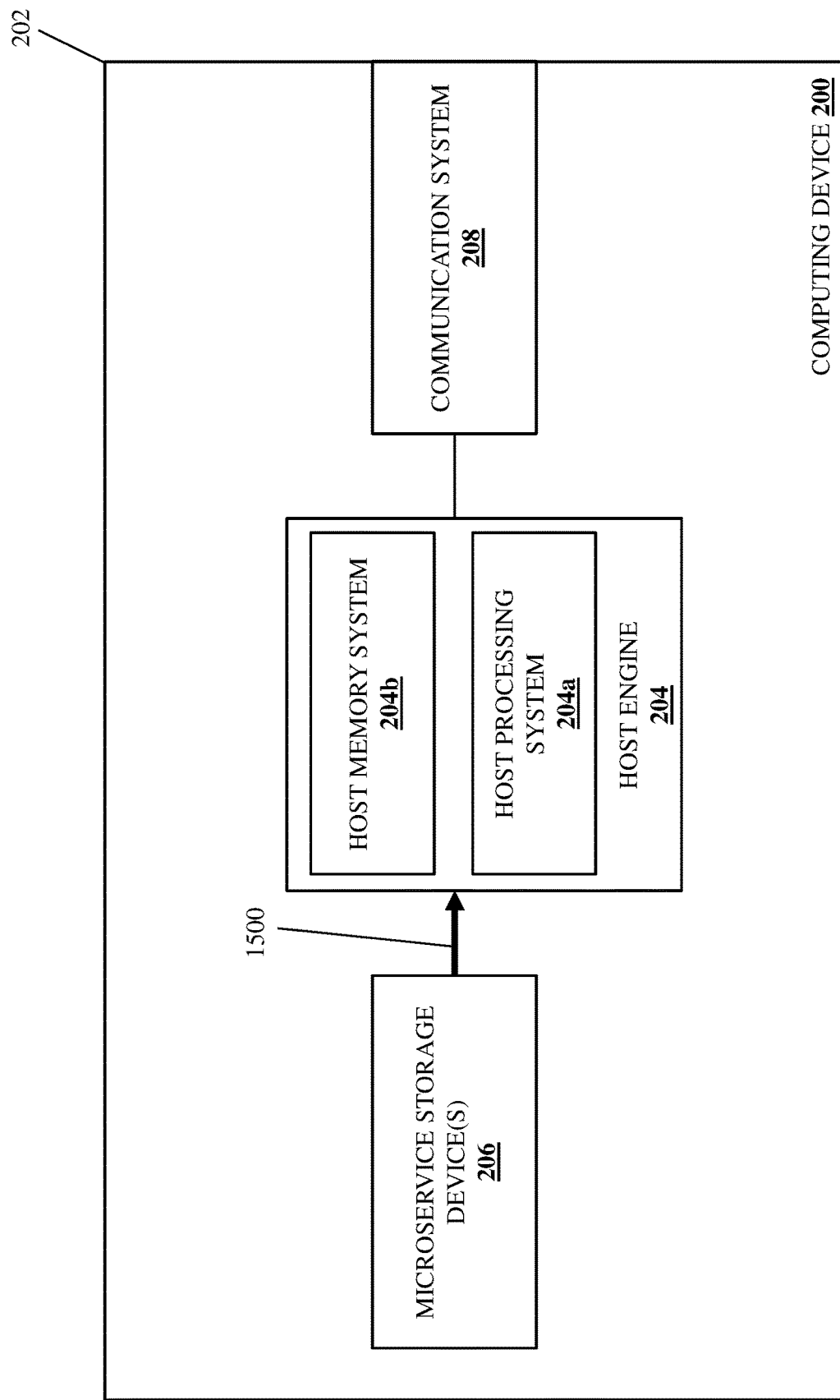
FIG. 15B is a schematic view illustrating an embodiment of the computing device of FIG. 2 operating during the method of FIG. 13.

The method 1300 then proceeds to block 1304 where the storage device management microservice presents a non-zone storage service to a host subsystem. With reference to FIGS. 15A and 15B, in an embodiment of block 1304, the non-zone storage service engine 1402a in the storage device management microservice 1402 may perform non-zone storage service presentment operation 1500 that include presenting a non-zone storage service via the communication system 312 and to the host engine 204 in the computing device 200. For example, the host engine 204 may be configured to utilize a particular non-zone storage service, and thus the storage device management microservice 1402 may be configured with a non-zone storage service engine 1402a that presents that particular non-zone storage service to the host engine 204. As discussed above, the non-zone storage service presented by the non-zone storage service engine 1402a in the storage device management microservice 1402 to the host engine 204 at block 1304 may include a block storage service that the host engine 204 is configured to utilize, an object storage service that the host engine 204 is configured to utilize, a file storage service that the host engine 204 is configured to utilize, or other non-zone storage services that one of skill in the art in possession of the present disclosure would appreciate that the host engine 204 may be configured to utilize. However, while the non-zone storage service is described as being presented by the non-zone storage service engine 1402a in the storage device management microservice 1402 to the host engine 204, one of skill in the art in possession of the present disclosure will appreciate how the non-zone storage service engine 1402a in the storage device management microservice 1402 may present the non-zone storage service to a compute microservice in the microservice storage device 1100 while remaining within the scope of the present disclosure as well.

Figure 16A:
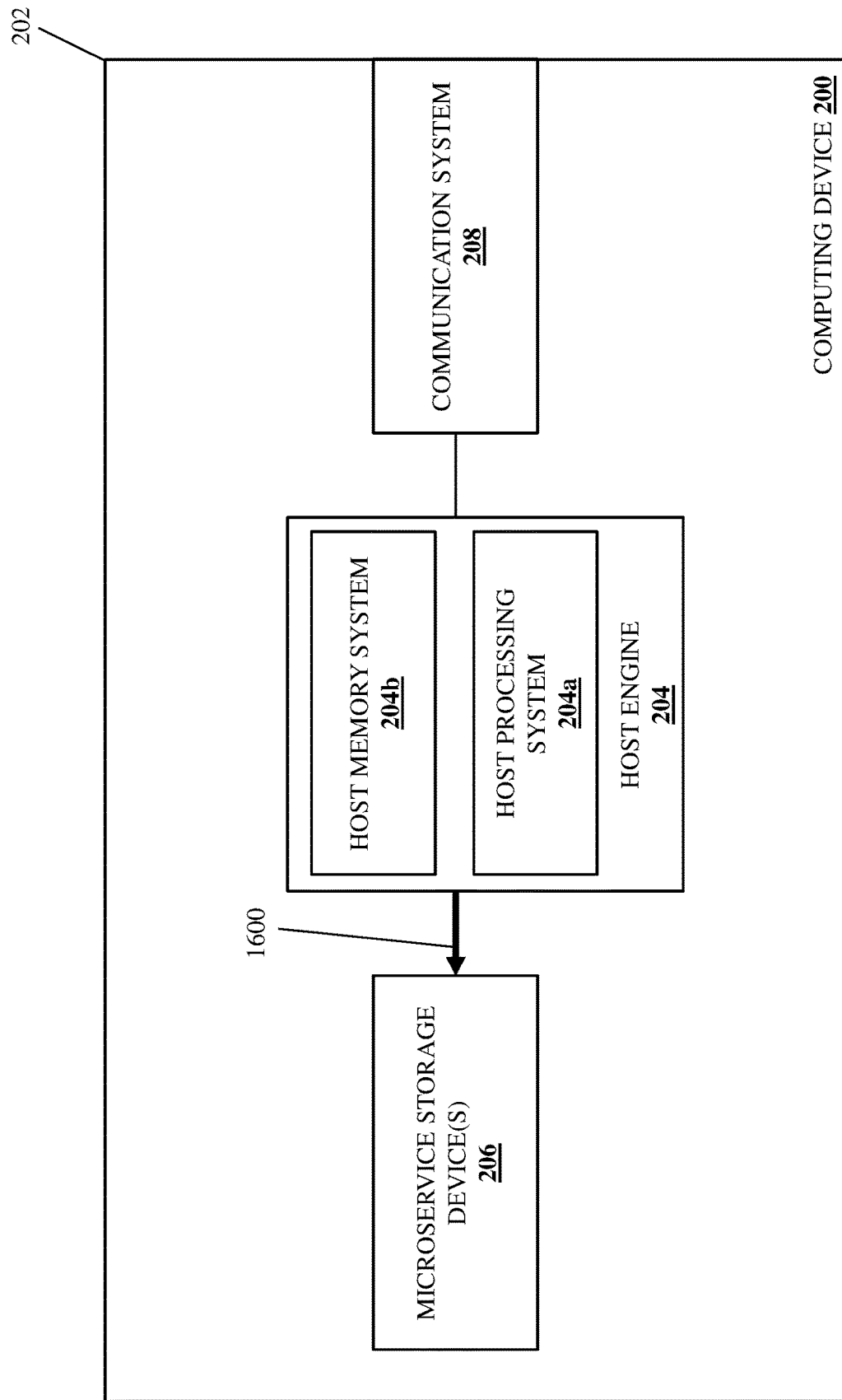
FIG. 16A is a schematic view illustrating an embodiment of the computing device of FIG. 2 operating during the method of FIG. 13.
Figure 16B:
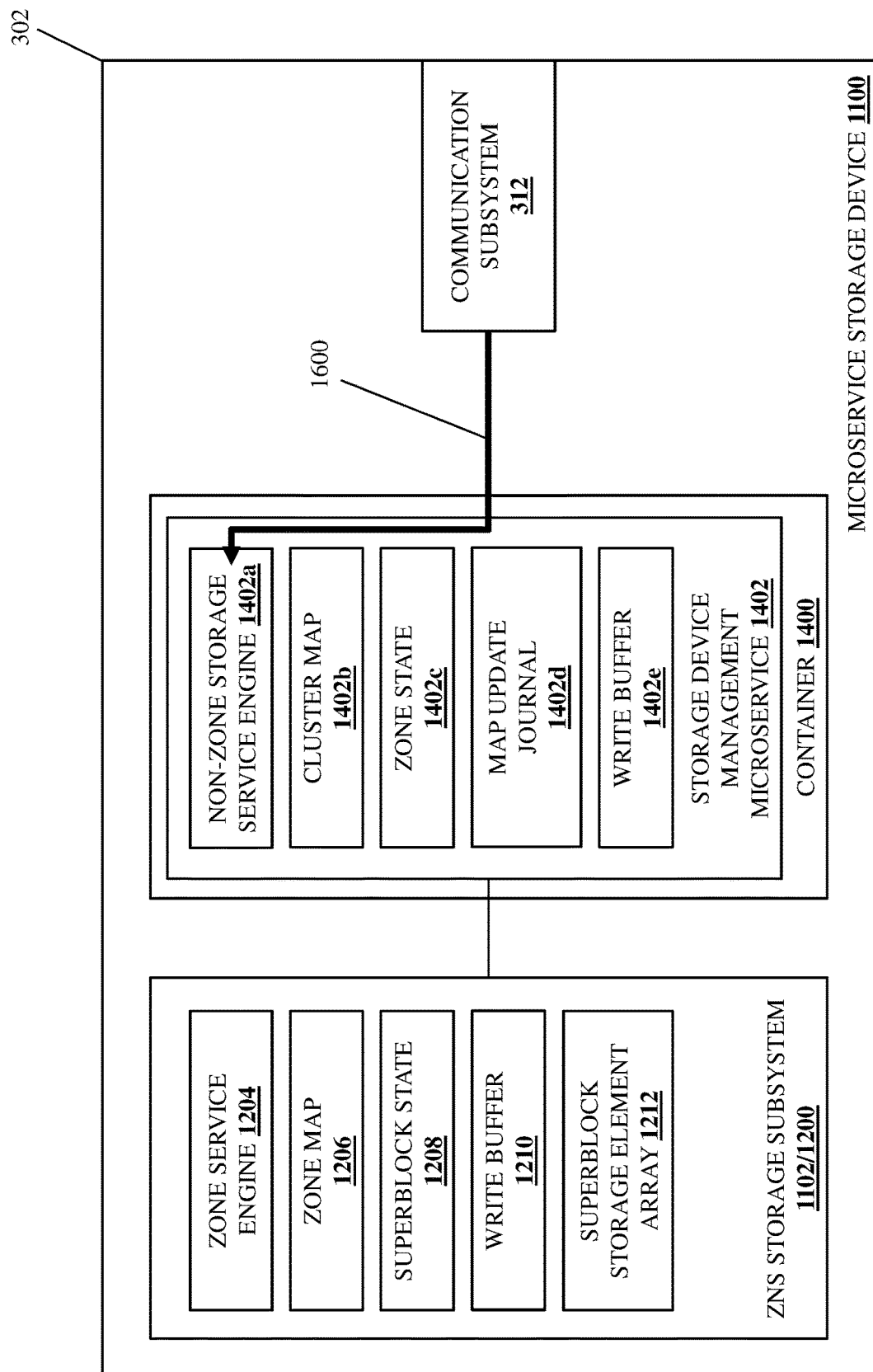
FIG. 16B is a schematic view illustrating an embodiment of the microservice storage device of FIG. 11 operating during the method of FIG. 13.

The method 1300 then proceeds to block 1306 where the storage device management microservice receives a storage command from the host subsystem that is associated with a storage operation. With reference to FIGS. 16A and 16B, in an embodiment of block 1306, the non-zone storage service engine 1402a in the storage device management microservice 1402 may perform storage command receiving operation 1600 that include the host engine 204 generating and transmitting a storage command that the storage device management microservice 1402 receives via the communication system 312. For example, the host engine 204 may be configured to generate and transmit a storage command that conforms to the non-zone storage service presented by the non-zone storage service engine 1402a in the storage device management microservice 1402, and the storage device management microservice 1402 may receive the storage command via that non-zone storage service. As such, the storage command may conform to a block storage service, an object storage service, a file storage service, or other non-zone storage services that would be apparent to one of skill in the art in possession of the present disclosure. Furthermore, in specific example, the storage command may be associated with a storage operation such as a write operation (e.g., associated with a write command), a read operation (e.g., associated with a read command), and/or other storage operations that would be apparent to one of skill in the art in possession of the present disclosure.

Figure 17:
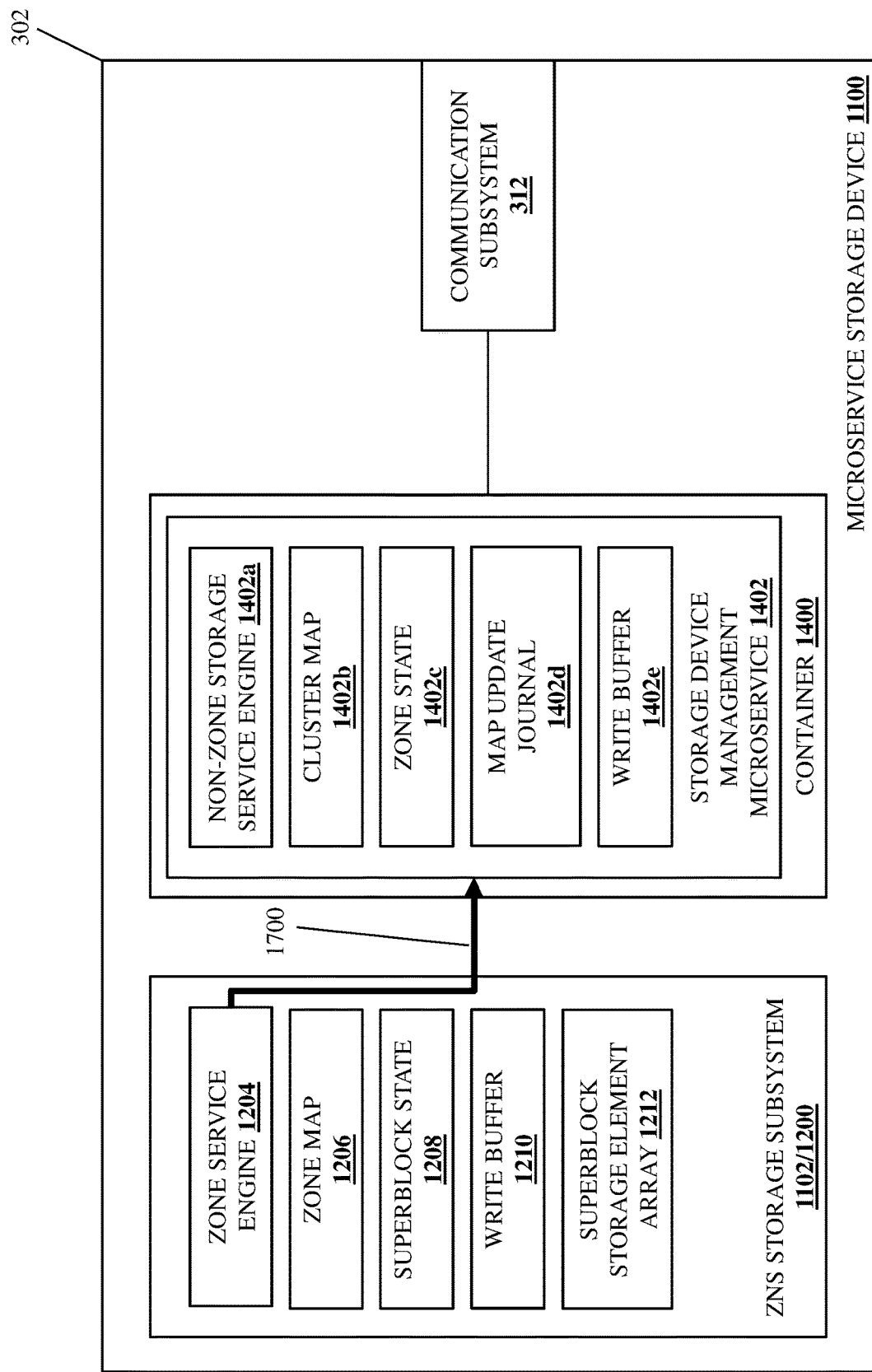
FIG. 17 is a schematic view illustrating an embodiment of the microservice storage device of FIG. 11 operating during the method of FIG. 13.
Figure 18A:
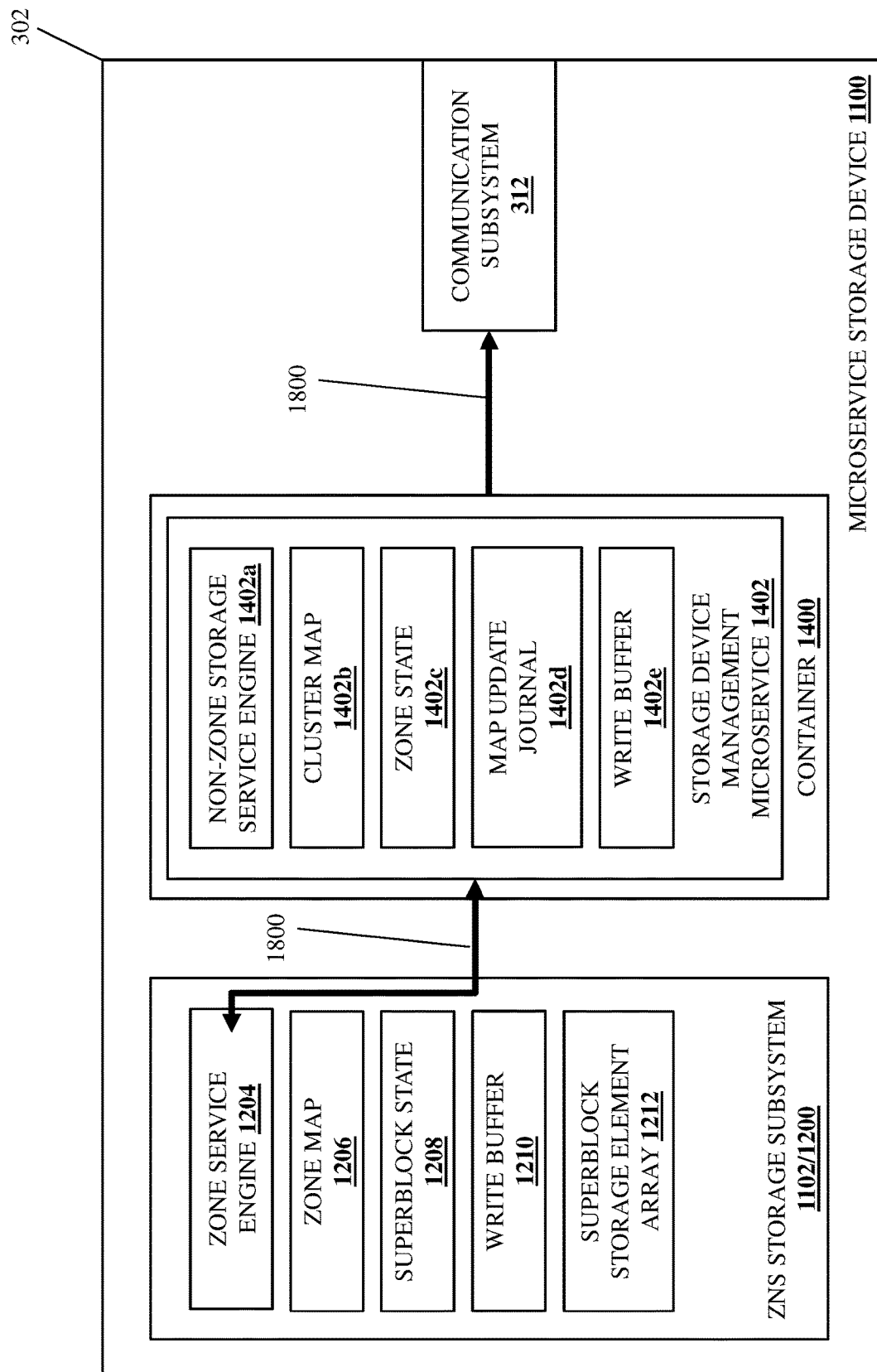
FIG. 18A is a schematic view illustrating an embodiment of the microservice storage device of FIG. 11 operating during the method of FIG. 13.
Figure 18B:
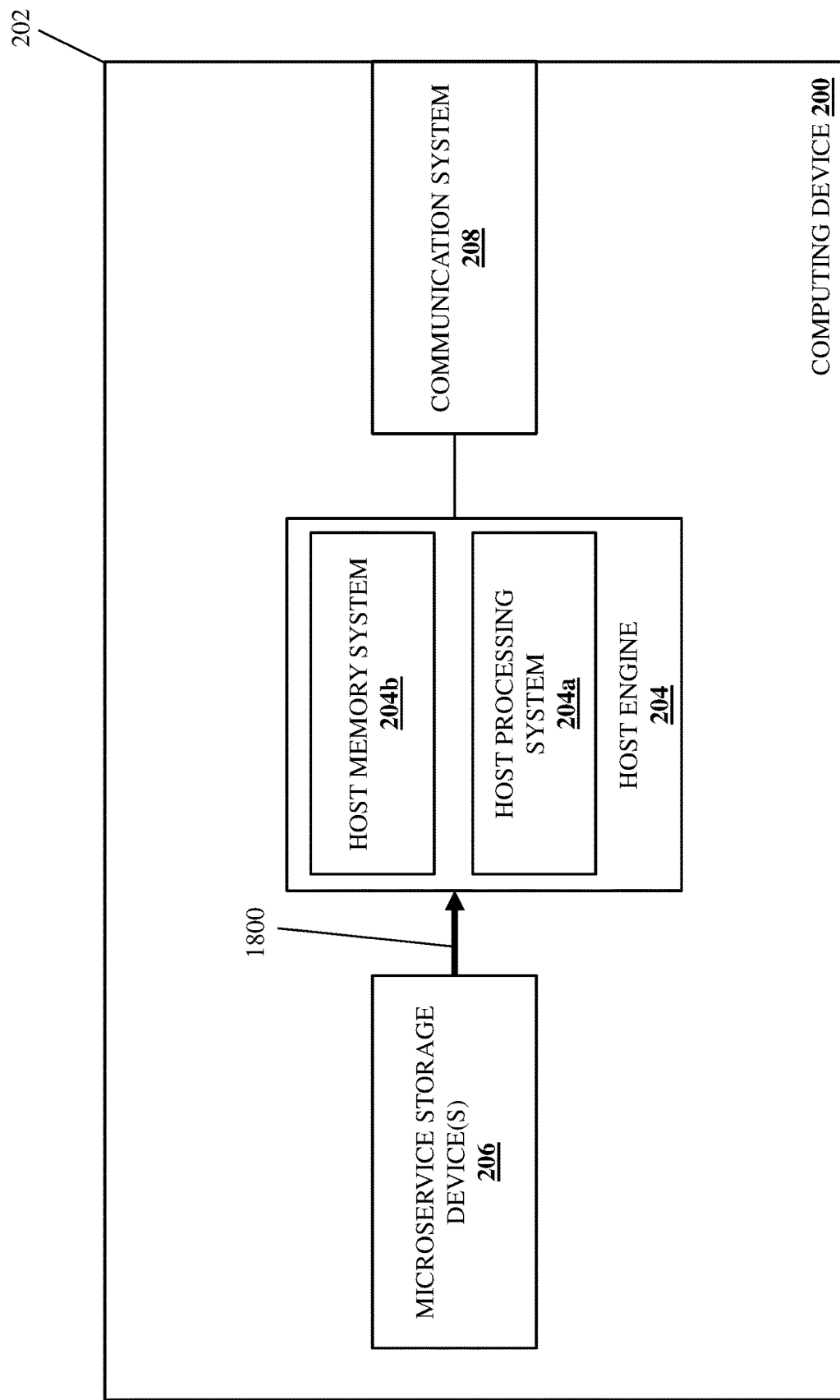
FIG. 18B is a schematic view illustrating an embodiment of the computing device of FIG. 2 operating during the method of FIG. 13.

The method 1300 then proceeds to block 1308 where the storage device management microservice utilizes the zone storage service to perform the storage operations on the zoned namespace storage subsystem as applicable. With reference to FIG. 17, in an embodiment of block 1308, the zone storage service engine 1204 in the ZNS storage subsystem 1102/1200 may perform zone storage service presentment operation 1700 that include presenting a zone storage service to the storage device management microservice 1402. For example, in addition to presenting the non-zone storage service to the host engine 204, the storage device management microservice 1402 may be configured to utilize the zone storage service presented by the zone storage service engine 1204 in the ZNS storage subsystem 1102/1200. With reference to FIGS. 18A and 18B, at block 1308, the storage device management microservice 1402 may be configured to perform storage operations 1800 that may include the performance of any storage operations (e.g., write operations, read operations, background operations, etc.) on the ZNS storage subsystem 1102/1200 via the zone storage service presented by the zone storage service engine 1204, as well as any associated communications with the host engine 204.

As such, in one specific example and at block 1308, the storage device management microservice 1402 may write data to the ZNS storage subsystem 1102/1200 via the zone storage service presented to it by the zone storage service engine 1204 and based on a write command received from the host engine 204 via the non-storage service it presented to the host engine 204 using the non-zone storage service engine 1402a, and provide a write confirmation to the host engine 204. For example, in response to receiving a write command, the storage device management microservice 1402 may buffer the write command, remap the write command to corresponding ZNS regions in the ZNS storage subsystem 1102/1200, and then reissue the write command to the ZNS storage subsystem 1102/1200 (e.g., either immediately or after some buffering period). In addition, the storage device management microservice 1402 may add redundancy information to the data prior to providing the write in the ZNS storage subsystem 1102/1200, perform encryption operations on the data, and/or perform other operations that one of skill in the art in possession of the present disclosure would recognize as being performed as part of a write operation.

In another specific example and at block 1308, the storage device management microservice 1402 may read data from the ZNS storage subsystem 1102/1200 via the zone storage service presented to it by the zone storage service engine 1204 and based on a read command received from the host engine 204 via the non-storage service it presented to the host engine 204 using the non-zone storage service engine 1402a, and provide that data to the host engine 204. For example, in response to receiving a read command, the storage device management microservice 1402 may perform a one-to-one mapping of the read command to the ZNS storage subsystem 1102/1200, but in the event the ZNS storage subsystem 1102/1200 cannot provide the data subject to the read command (e.g., due to higher error rates in ZNS storage subsystems, etc.), the storage device management microservice 1402 may perform data rebuild operations (e.g., using redundancy data in other ZNS regions) before providing that data as part of the read command. In addition, the storage device management microservice 1402 perform decryption operations on the data, and/or perform other operations that one of skill in the art in possession of the present disclosure would recognize as being performed as part of a read operation In yet another specific example and at block 1308, the storage device management microservice 1402 may initiate a background operation in the ZNS storage subsystem 1102/1200 via the zone storage service presented to it by the zone storage service engine 1204 and based on a background operation that may have been self-initiated within the storage device management microservice 304. However, while several specific examples of storage operations have been described, one of skill in the art in possession of the present disclosure will appreciate how other storage operations may fall within the scope of the present disclosure as well.

As will be appreciated by one of skill in the art in possession of the present disclosure, subsequent to any performance of the method 1300, the method 1300 may be performed again to reconfigure the microservice storage device 1100. For example, following the performance of the method 1300 described above to configure the microservice storage device 1100 with a first storage device management microservice that presents a first non-zone storage service to a first host subsystem (e.g., the host engine 204 in the computing device 200), the storage device operating system provided by the microservice storage device 1100 may receive a storage device management microservice reconfiguration instruction and, in response, may reconfigure the first storage device management microservice to provide a second storage device management microservice that presents a second non-zone storage service that is different than the first non-zone storage service to second host subsystem (e.g., a host engine in a computing device that is different than the host engine 204/computing device 200). The second host subsystem may then provide a storage command to the second storage device management microservice via the second non-zone storage service, and the second storage device management microservice will utilize the second zone storage service to perform a storage operation associated with that storage command on the ZNS storage subsystem 1102/1200. As such, the microservice storage device 1100 may be quickly and easily reconfigured for use with different host subsystems that utilize different storage services. Furthermore, while not illustrated or described in detail, similar reconfiguration operations may be performed to allow different ZNS storage subsystems to be provided in the microservice storage device 1100 while remaining within the scope of the present disclosure as well.

In some embodiments, in addition to providing an interface between the host engine 204 and the ZNS storage subsystem 1102/1200 to allow storage operations to be performed on the ZNS storage subsystem 1102/1200 based on storage commands received from the host engine 204, the storage device management microservice 1402 may also be configured to perform data error preparation, data error correction, and/or other data error recovery operations on data stored in the ZNS storage subsystem 1102/1200, persistent storage operations for data that is being stored in the ZNS storage subsystem 1102/1200, as well as any other data operations that are required to ensure the integrity of the data that is stored (or that is being stored) on the ZNS storage subsystem 1102/1200. As such, the storage device management microservice 1402 may include, or may be configured to access, any hardware or software functionality that is required to perform those data operations (e.g., Cyclic Redundancy Check (CRC) software; persistent memory included in the microservice storage device 1100, included in the computing device 200 and coupled to the microservice storage device 1100, coupled to the microservice storage device 1100 via a network, etc.; and/or other hardware/software that would be apparent to one of skill in the art in possession of the present disclosure).

Figure 19:
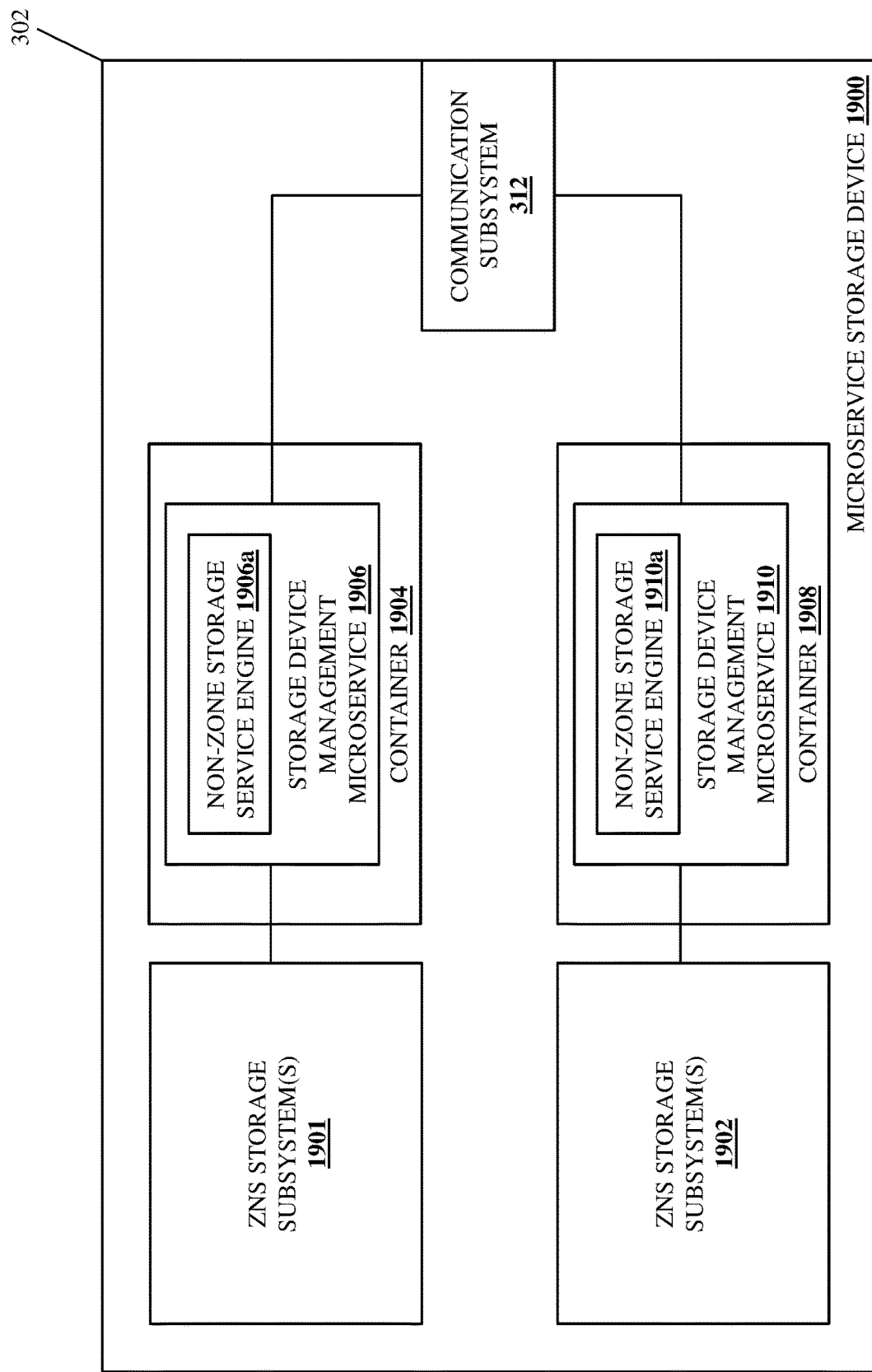
FIG. 19 is a schematic view illustrating an embodiment of a microservice storage device that may be included in the zoned namespace storage device system provided according to the teachings of the present disclosure.

While the method 1300 is illustrated and described above as providing a single storage device management microservice for a single ZNS storage subsystem, one of skill in the art in possession of the present disclosure will appreciate how a respective storage device management microservice may be provided for each type of ZNS storage subsystem in the microservice storage device. For example, with reference to FIG. 19, a microservice storage device 1900 is illustrated that is similar to the microservice storage device 300 discussed above with reference to FIG. 3, and thus similar elements have been provided with similar numbers. As such, the microservice storage device 1900 illustrated in FIG. 19 includes the chassis 302 housing the communication system 312. In addition, the chassis 302 of the microservice storage device 1900 includes one or more first type ZNS storage subsystems 1901 that provide a first subset of the storage subsystem(s) 310 discussed above with reference to FIG. 3, and one or more second type ZNS storage subsystems 1902 that are different than the first type ZNS storage subsystems 1901 and that provide a second subset of the storage subsystem(s) 310 discussed above with reference to FIG. 3. In specific embodiments, the microservice storage device 1900 may include NVMe ZNS SSD storage device(s) that utilize Quad-Level Cell (QLC) storage technology, and NVMe ZNS SSD storage device(s) that utilize Triple-Level Cell (TLC) storage technology, although other storage technologies will fall within the scope of the present disclosure as well.

As illustrated, the method 1300 may be performed to provide a container 1904 with a storage device management microservice 1906 that is configured to manage the ZNS storage subsystem(s) 1901 and that includes a non-zone storage service engine 1906a that presents the non-zone storage service to the host engine 204 (as well as the cluster map, zone state, map update journal, write buffer, and/or other information discussed above but not illustrated in FIG. 19), along with a container 1908 with a storage device management microservice 1910 that is configured to manage the ZNS storage subsystem(s) 1902 and that includes a non-zone storage service engine 1910a that presents the non-zone storage service to the host engine 204 (as well as the cluster map, zone state, map update journal, write buffer, and/or other information discussed above but not illustrated in FIG. 19). In a specific example, the container 1904/storage device management microservice 1906 and the container 1908/storage device management microservice 1910 may be provided by the same DPU, each by a respective different DPU, and/or in other manners that would be apparent to one of skill in the art in possession of the present disclosure. Furthermore, the communication system 312 may allow communications between the container 1904/storage device management microservice 1906 and the container 1908/storage device management microservice 1910, and in some cases may provide a direct communication path between the two (i.e., without the need to transmit communication via a network). One of skill in the art in possession of the present disclosure will appreciate how the embodiment of the microservice storage device 1900 illustrated in FIG. 19 allows the mixing of different storage technologies/elements/media types (e.g., QLC NAND, TLC NAND, etc.) in a ZNS storage device, with respective storage device management microservices provided to manage each type of storage technologies/elements/media. For example, such a ZNS storage device may allow the different storage technologies/elements/media types to be tiered (e.g., to store different priority data in different storage technologies/elements/media types), with separate storage device management microservices managing the storage operations on each storage technologies/elements/media type.

Furthermore, while the ZNS storage device/ZNS storage subsystem techniques are illustrated and described above as being provided within a storage device, in other embodiments those ZNS storage device/ZNS storage subsystem techniques may be implemented in networked systems while providing the benefits described above. For example, with reference to FIG. 20, a networked system is illustrated that includes a computing device 2000 with a processing system and a memory system that includes instructions that, when executed by the processing system, cause the processing system to provide a host engine 2002 that may be configured to operate similarly to the host engines discussed above. The computing device 2000 may also be configured to provide a computing device operating system that is similar to the storage device operating systems discussed above, and thus that computing device operating system may be configured to provide a container 2004 having a storage device management microservice 2006 (e.g., similarly as described for the storage device operating system 706 providing the container 710 that includes the storage device management microservice 710a in the microservice storage device 700 discussed above with reference to FIG. 7B).

As illustrated, the storage device management microservice 2006 may be coupled to a network 2008 that may be provided by a Local Area Network (LAN), the Internet, combinations thereof, and/or other networks that would be apparent to one of skill in the art in possession of the present disclosure. The networked system also includes a storage appliance 2010 having a networking controller/bridge 2012 that is coupled to the network 2008, and one or more storage devices 2014 including one or more ZNS storage subsystems that are coupled to the networking controller/bridge 2016. Similarly as described above, the storage device management microservice 2006 may include a non-zone storage service engine 2006a that is configured to present a non-zone storage service to the host engine 2002, and may be configured to utilize a zone storage service presented by the ZNS storage subsystem(s) 2016 via the network 2008 to perform storage operations on the ZNS storage subsystem(s) 2016 that are instructed via storage commands received from the host engine 2002 via the non-zone storage service presented by the storage device management microservice 2006/non-zone storage service engine 2006a to the host engine 2002.

Thus, systems and methods have been described that provide a storage device management microservice in a storage device that interfaces between a host subsystem coupled to the storage device and a zoned namespace storage subsystem included in the storage device in order to perform storage operations, which were instructed by the host subsystem via a non-zone storage service presented by the storage device management microservice to the host subsystem, via a zone storage service presented by the zoned namespace storage subsystem to the storage device management microservice. For example, the zoned namespace storage device system of the present disclosure may include a zoned namespace storage device coupled to a computing device. The zoned namespace storage device includes a zoned namespace storage subsystem that is configured to store data, and storage device compute hardware that is coupled to the zoned namespace storage subsystem and that is configured to provide a storage device operating system that includes a storage device management microservice. The storage device management microservice presents a non-zone storage service to a host subsystem in the computing device and receives, via the non-zone storage service presented to the host subsystem, a storage command from the host subsystem that is associated with a storage operation. The storage device management microservice then utilizes a zone storage service presented to the storage device management microservice by the zoned namespace storage subsystem to perform the storage operation on the zoned namespace storage subsystem. As such, the zoned namespace storage subsystem may be utilized by different host subsystems without requiring modification to those host subsystems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A reconfigurable microservice storage device system, comprising:
   a computing device; and
   a plurality of storage devices that are coupled to the computing device and that each include:
      storage device compute hardware; and
      a storage subsystem that is coupled to the storage device compute hardware and that is configured to store data, wherein the computing device is configured to:
         configure the storage device compute hardware in each of a first subset of the plurality of storage devices to provide a respective first storage device operating system that includes a respective first storage device management microservice that manages the storage subsystem in that storage device; and
         configure the storage device compute hardware in each of a second subset of the plurality of storage devices to provide a respective second storage device operating system that includes:
            a respective second storage device management microservice that manages the storage subsystem in that storage device; and
            at least one respective second compute microservice that performs at least one second compute operation.

2. The system of claim 1, wherein each respective first storage device management microservice and each respective second storage device management microservice includes a Flash Translation Layer (FTL), and wherein each at least one respective second compute microservice includes at least one autonomous compute application.

3. The system of claim 1, wherein each respective first storage device management microservice is included in a respective first container that is provided using the respective first storage device operating system, and wherein each respective second storage device management microservice and each at least one respective second compute microservice is included in a respective second container that is provided using the respective second storage device operating system.

4. The system of claim 1, wherein the at least one second compute operation performed using the at least one respective second compute microservice is offloaded from the computing device.

5. The system of claim 1, wherein the computing device is configured to:
   reconfigure the storage device compute hardware in at least one of the first subset of the plurality of storage devices to provide the respective first storage device operating system that includes:
      the respective first storage device management microservice; and
      at least one respective first compute microservice that performs at least one first compute operation.

6. The system of claim 1, wherein the computing device is configured to:
   reconfigure the storage device compute hardware in each of the second subset of the plurality of storage devices to provide the respective second storage device operating system that includes the respective second storage device management microservice, and that does not include the at least one respective second compute microservice.

7. The system of claim 1, wherein the storage device compute hardware in each of the plurality of storage devices provides a Solid State Drive (SSD) storage device controller for that storage device.

8. An Information Handling System (IHS), comprising:
a storage device chassis;
a storage device processing system that is included in the storage device chassis; and
a storage device memory system that is included in the storage device chassis, that is coupled to the storage device processing system, and that includes instructions that, when executed by the storage device processing system, cause the storage device processing system to:
provide, using the storage device processing system, a storage device operating system that includes a storage device management microservice that manages a storage subsystem that is coupled to the storage device processing system and that is configured to store data;
provide, using the storage device operating system, at least one compute microservice that performs at least one compute operation;
receive a first reconfiguration instruction; and
provide, in response to receiving the first reconfiguration instruction, the storage device operating system that includes the storage device management microservice, and that does not include the at least one compute microservice.

9. The IHS of claim 8, wherein storage device management microservice includes a Flash Translation Layer (FTL), and wherein the at least one compute microservice includes at least one autonomous compute application.

10. The IHS of claim 8, wherein each of the storage device management microservice and each at least one compute microservice is included in a respective container that is provided using the storage device operating system.

11. The IHS of claim 8, wherein the at least one compute operation performed using the at least one compute microservice is offloaded from a computing device that includes the IHS.

12. The IHS of claim 8, wherein the storage device processing system and the storage device memory system provide a Solid State Drive (SSD) storage device controller.

13. The IHS of claim 8, wherein the storage device memory system includes instructions that, when executed by the storage device processing system, cause the storage device processing system to:
receive, subsequent to receiving the first reconfiguration instruction, a second reconfiguration instruction; and
provide, in response to receiving the second reconfiguration instruction, the storage device operating system that includes the storage device management microservice and the at least one compute microservice.

14. A method for configuring a storage device to provide microservices, comprising:
configuring, by a computing device that is coupled to a plurality of storage devices, storage device compute hardware in each of a first subset of the plurality of storage devices to provide a respective first storage device operating system that includes a respective first storage device management microservice that manages the storage subsystem in that storage device; and
configuring, by the computing device, the storage device compute hardware in each of a second subset of the plurality of storage devices to provide a respective second storage device operating system that includes:
a respective second storage device management microservice that manages the storage subsystem in that storage device; and
at least one respective second compute microservice that performs at least one second compute operation.

15. The method of claim 14, wherein each respective first storage device management microservice and each respective second storage device management microservice includes a Flash Translation Layer (FTL), and wherein each at least one respective second compute microservice includes at least one autonomous compute application.

16. The method of claim 14, wherein each respective first storage device management microservice is included in a respective first container that is provided using the respective first storage device operating system, and wherein each respective second storage device management microservice and each at least one respective second compute microservice is included in a respective second container that is provided using the respective second storage device operating system.

17. The method of claim 14, wherein the at least one second compute operation performed using the at least one respective second compute microservice is offloaded from the computing device.

18. The method of claim 14, further comprising:
reconfiguring, by the computing device, the storage device compute hardware in at least one of the first subset of the plurality of storage devices to provide the respective first storage device operating system that includes:
the respective first storage device management microservice; and
at least one respective first compute microservice that performs at least one first compute operation.

19. The method of claim 14, further comprising:
reconfiguring, by the computing device, the storage device compute hardware in each of the second subset of the plurality of storage devices to provide the respective second storage device operating system that includes the respective second storage device management microservice, and that does not include the at least one respective second compute microservice.

20. The method of claim 14, wherein the storage device compute hardware in each of the plurality of storage devices provides a Solid State Drive (SSD) storage device controller for that storage device.

* * * * *